US010025913B2

(12) United States Patent
Tian et al.

(10) Patent No.: US 10,025,913 B2
(45) Date of Patent: Jul. 17, 2018

(54) CROSS-APPLICATION AUTHENTICATION ON A CONTENT MANAGEMENT SYSTEM

(71) Applicant: Dropbox, Inc., San Francisco, CA (US)

(72) Inventors: Sang Tian, San Francisco, CA (US); Joshua Kaplan, San Francisco, CA (US); Devdatta Akhawe, Berkeley, CA (US)

(73) Assignee: DROPBOX, INC., San Francisco, CA (US)

( * ) Notice: Subject to any disclaimer, the term of this patent is extended or adjusted under 35 U.S.C. 154(b) by 172 days.

(21) Appl. No.: 14/985,072

(22) Filed: Dec. 30, 2015

(65) Prior Publication Data

US 2016/0253481 A1 Sep. 1, 2016

Related U.S. Application Data

(63) Continuation-in-part of application No. 14/634,008, filed on Feb. 27, 2015.

(51) Int. Cl.

| G06F 7/04 | (2006.01) |
|---|---|
| G06F 21/10 | (2013.01) |
| H04L 29/06 | (2006.01) |
| G06F 21/00 | (2013.01) |
| G06F 17/30 | (2006.01) |

(Continued)

(52) U.S. Cl.
CPC .............. *G06F 21/10* (2013.01); *G06F 17/30* (2013.01); *G06F 21/00* (2013.01); *H04L 61/303* (2013.01); *H04L 63/0236* (2013.01); *H04L 63/08* (2013.01); *G06F 2221/2101* (2013.01); *H04L 63/1483* (2013.01); *H04L 63/168* (2013.01); *H04L 67/02* (2013.01); *H04L 67/14* (2013.01)

(58) Field of Classification Search
CPC ............. G06Q 20/102; G06Q 20/3825; G06Q 30/0273; G06Q 20/3674; G06Q 20/3829; G06F 21/10; G06F 17/30; G06F 21/00; G06F 2221/2101

See application file for complete search history.

(56) References Cited

U.S. PATENT DOCUMENTS

| 9,065,819 B1 | 6/2015 | Shanmugam et al. |
| 9,208,298 B2 | 12/2015 | McCoy et al. |
| 9,374,361 B2 | 6/2016 | Khalil et al. |

(Continued)

*Primary Examiner* — Abiy Getachew
(74) *Attorney, Agent, or Firm* — Polsinelli PC

(57) ABSTRACT

Systems, methods, and computer-readable media for cross-application authentication on a content management system. A client application running at a client device that is not authenticated with a content management system can receive, from a web site associated with the content management system, a request to authenticate with the content management system under a user account used to authenticate a current session between a browser application at the client device and the website with the content management system. The client application can then obtain a uniform resource locator (URL) with a nonce associated with the client application, and send a command to the browser application including the URL and nonce. The command can trigger the browser application to use the URL and nonce to authenticate the client application with the content management system under the user account with which the current session between the browser application and the website is currently authenticated.

20 Claims, 18 Drawing Sheets

(51) Int. Cl.
*H04L 29/12* (2006.01)
*H04L 29/08* (2006.01)

(56) References Cited

U.S. PATENT DOCUMENTS

| | | |
|---|---|---|
| 2009/0260077 A1 | 10/2009 | Zhu et al. |
| 2011/0287739 A1 | 11/2011 | Bringas et al. |
| 2011/0296038 A1 | 12/2011 | Mandre |
| 2012/0260321 A1* | 10/2012 | Wendt .................. H04L 9/0863 726/5 |
| 2012/0272133 A1 | 10/2012 | Carroll et al. |
| 2012/0324556 A1 | 12/2012 | Yefimov et al. |
| 2013/0086669 A1 | 4/2013 | Sondhi et al. |
| 2013/0227668 A1 | 8/2013 | Mocanu |
| 2014/0082715 A1 | 3/2014 | Grajek et al. |
| 2014/0181944 A1 | 6/2014 | Ahmed |
| 2014/0207566 A1 | 7/2014 | Kamran et al. |
| 2014/0223527 A1* | 8/2014 | Bortz ..................... H04L 63/08 726/6 |
| 2014/0282983 A1 | 9/2014 | Ju et al. |
| 2015/0363581 A1 | 12/2015 | Ranadive et al. |

* cited by examiner

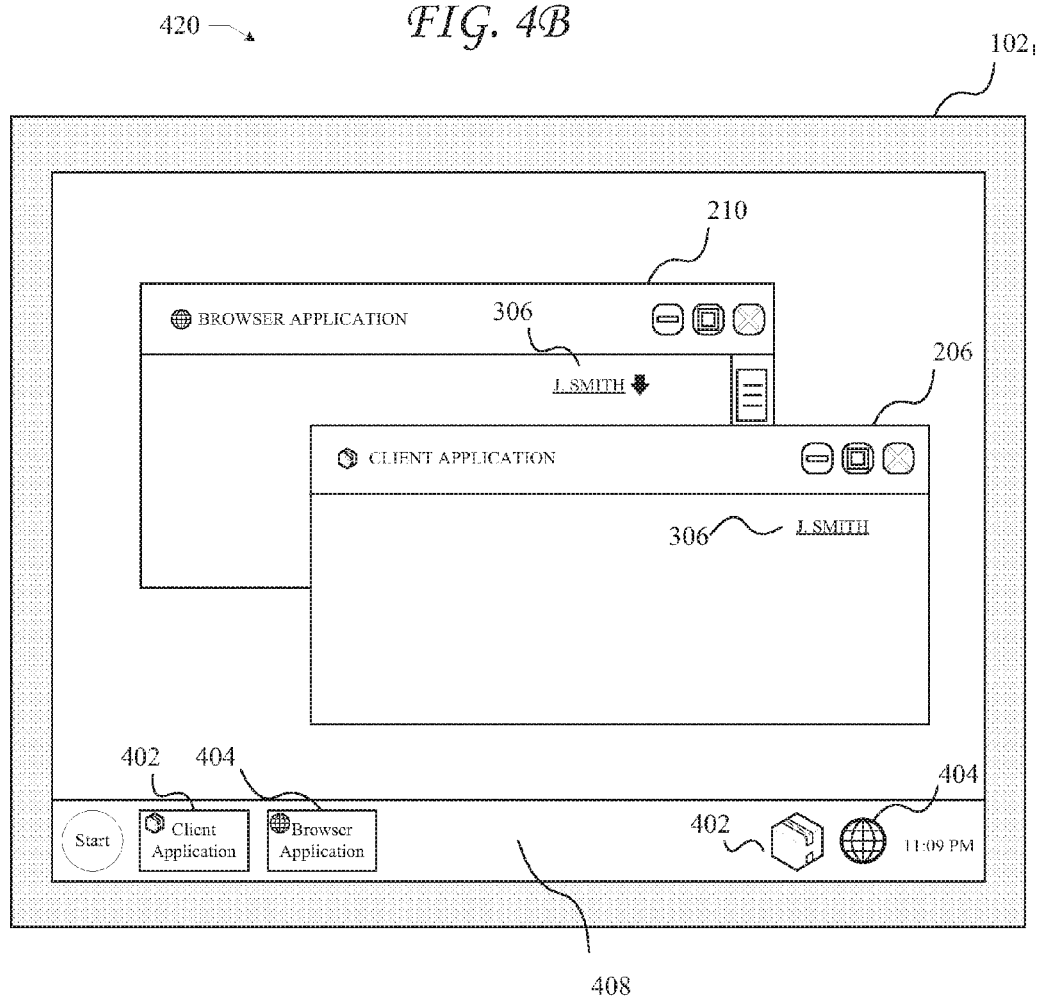

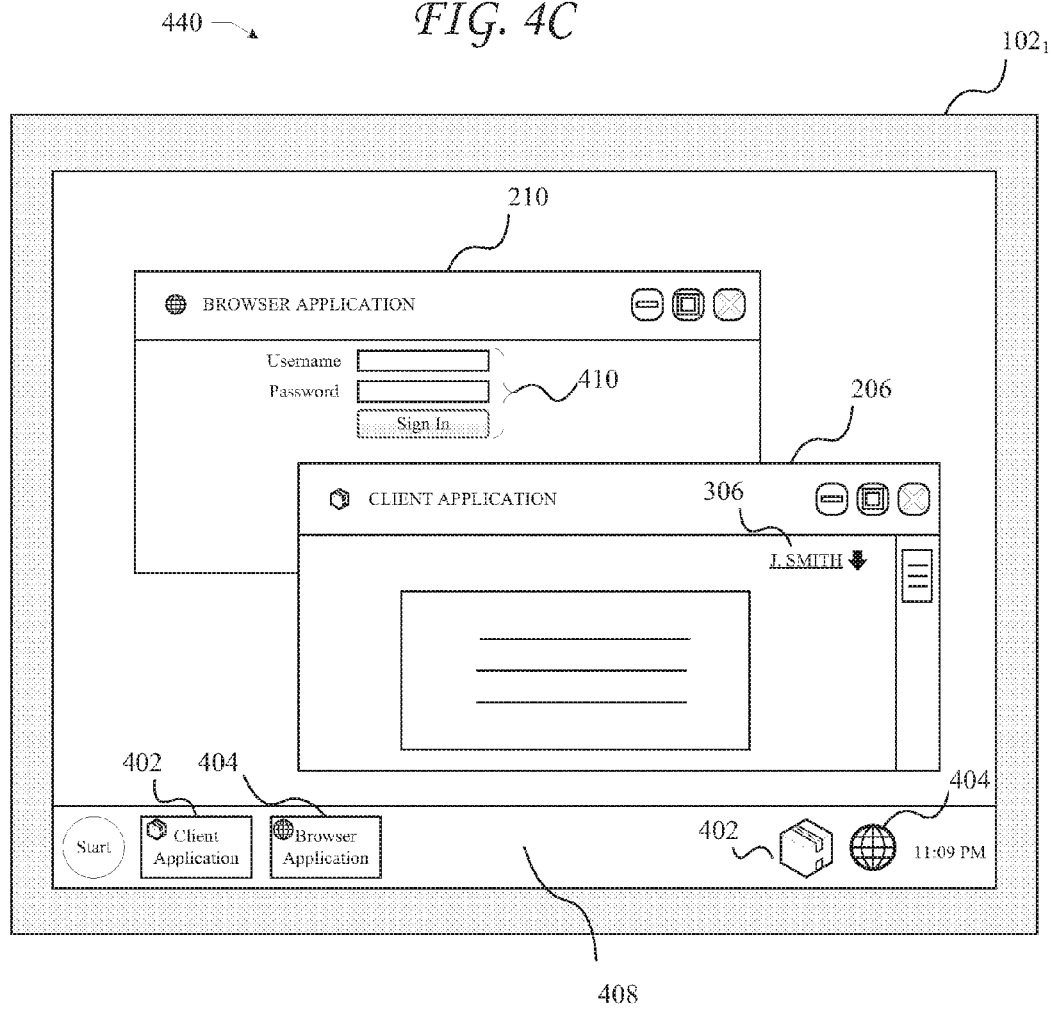

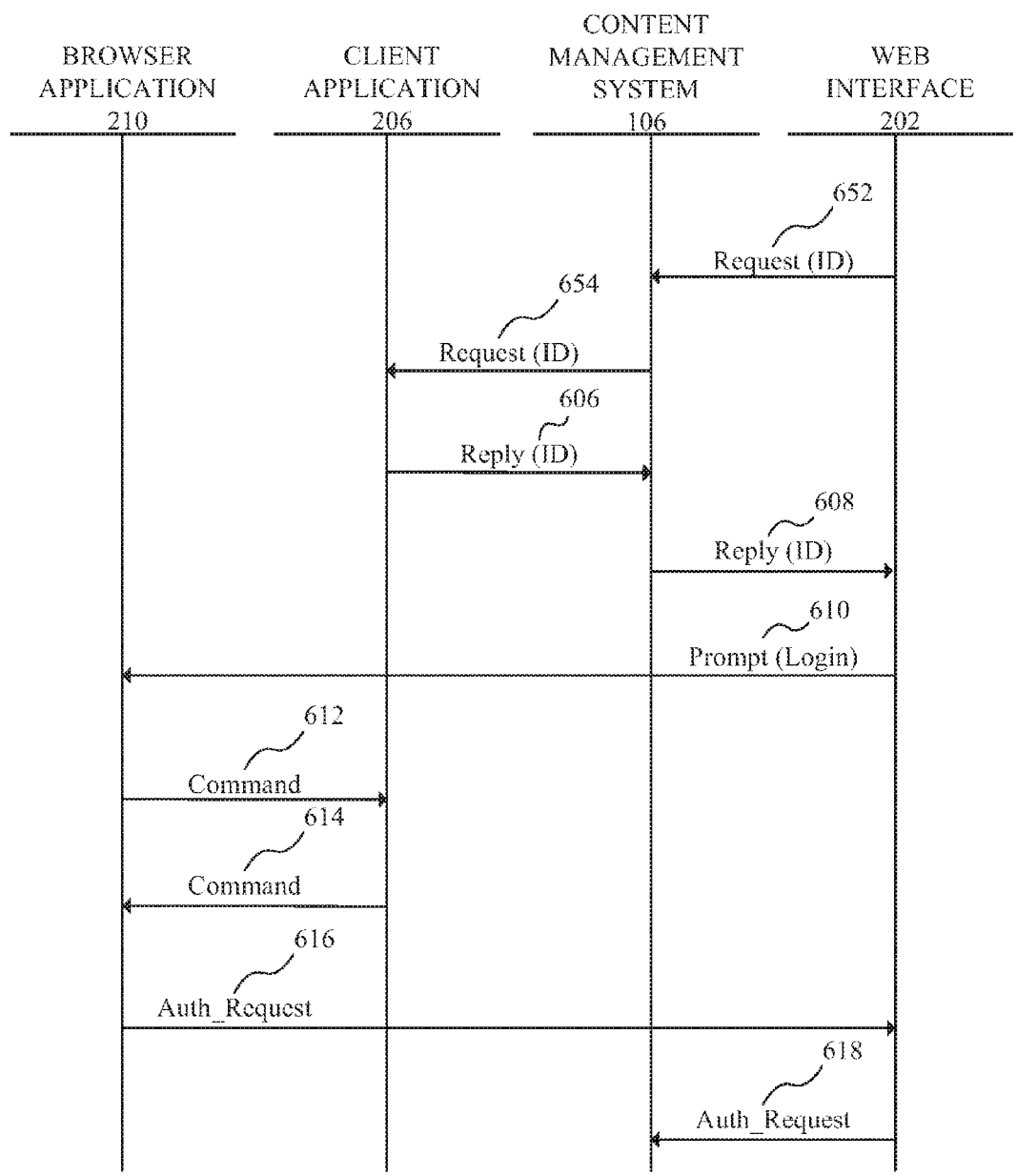

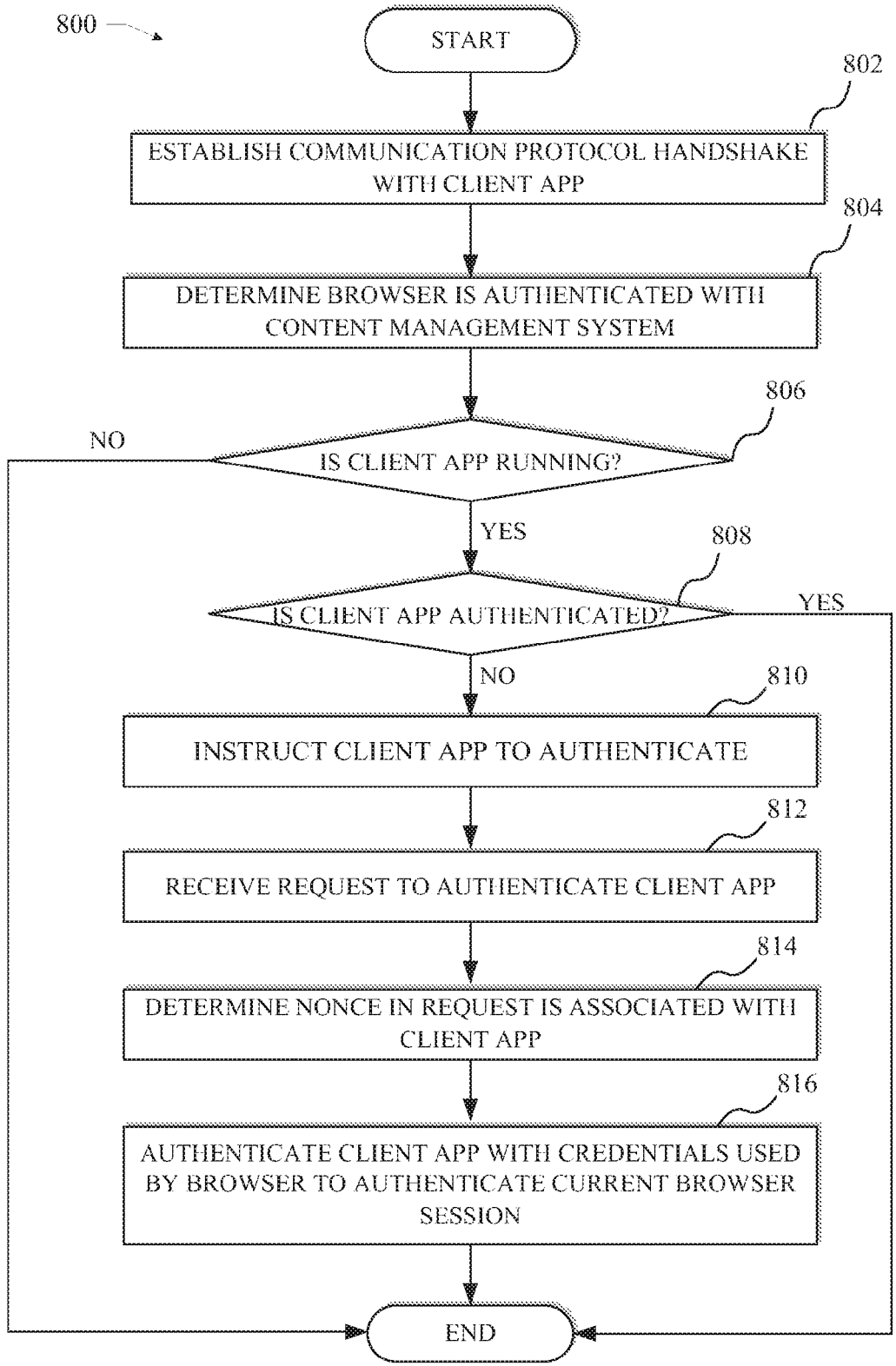

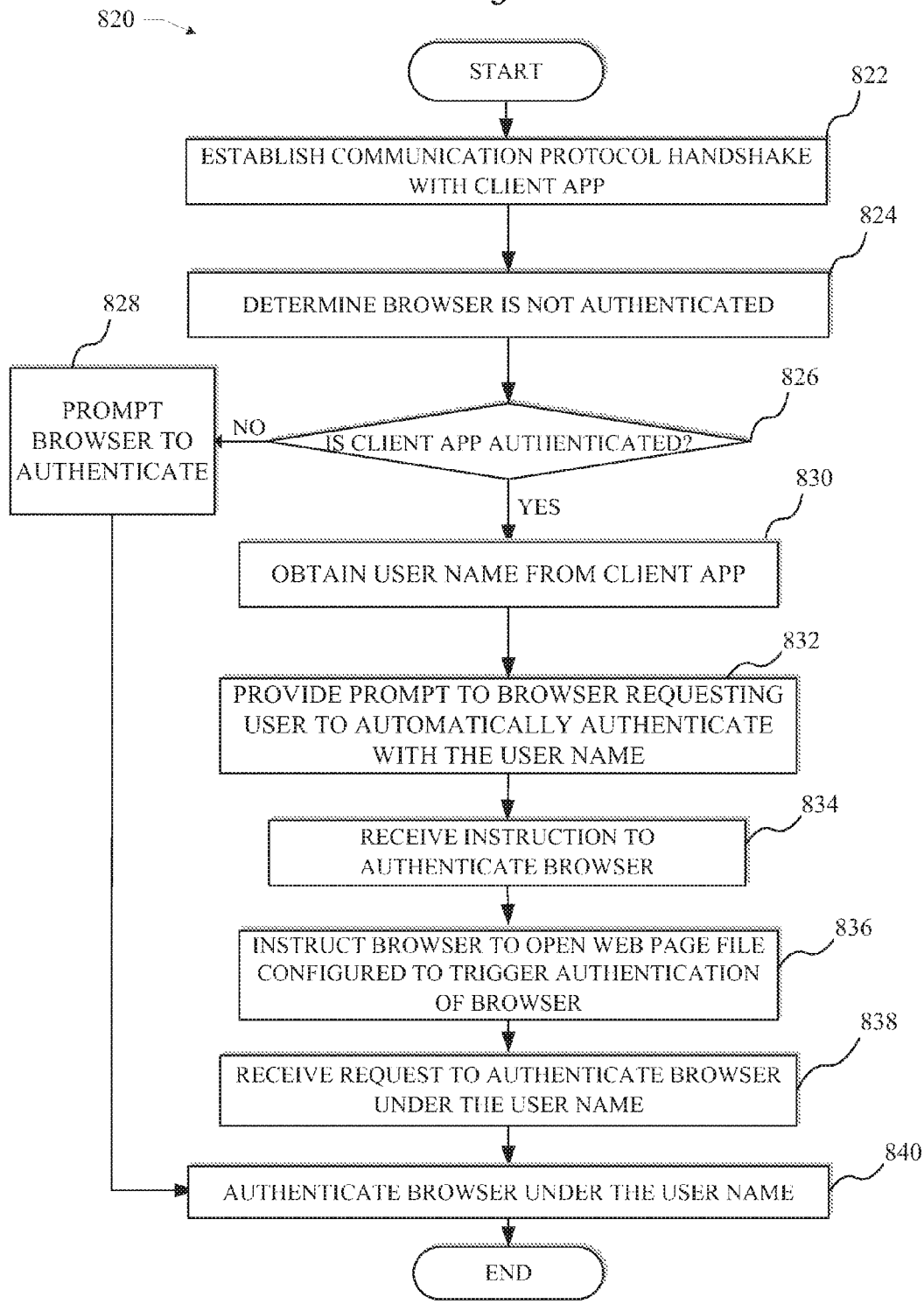

CROSS-APPLICATION AUTHENTICATION ON A CONTENT MANAGEMENT SYSTEM

CROSS REFERENCE TO RELATED APPLICATIONS

This application is a continuation-in-part of, and claims the benefit of priority to, of U.S. application Ser. No. 14/634,008, filed on Feb. 27, 2015, entitled "APPLICATION-ASSISTED LOGIN FOR A WEB BROWSER", which is expressly incorporated by reference herein in its entirety.

This application is related to U.S. application Ser. No. 14/984,993, entitled "COMMUNICATION PROTOCOLS FOR AN ONLINE CONTENT MANAGEMENT SYSTEM", filed on Dec. 30, 2015, which is expressly incorporated by reference herein in its entirety.

TECHNICAL FIELD

The present technology pertains to online content management systems, and more specifically pertains to cross-application authentication on an online content management system.

BACKGROUND

An online synchronized content management system, such as DROPBOX from Dropbox Inc. of San Francisco, Calif., allows users to store their content items in an online user account that can be accessed from any computing device. Users can upload content items from one computing device to their online user account and access the uploaded content items from other computing devices. Users can also share uploaded content items with other users, to provide other users access to the shared content items from their respective devices.

Users can access the content items from a browser application installed on the user's client device. For example, a user can use a web browser to access the content items from a website of the content management system. Users can also access the content items from a client-side application installed on the user's device. Often, users may have both a web browser application and a client-side application installed on the user's device, which they can use, either together or alone, to access content items on the content management system. The ability to use both types of applications to access content on the content management system can confer various benefits to the user. For example, the client-side application can offer persistent and seamless synchronization of local data with the content management system, while the web browser application may offer a different, web-based experience to the user.

Unfortunately, since the browser application and the client-side application are separate applications, authentication of one application at the user's device does not automatically result in authentication of the other application at the user's device. Accordingly, in order to sign into a user account on both the browser application and the client-side application, a user would typically duplicate the sign-in process from both applications. The user would provide the same user credentials twice in order to authenticate from both applications. This process can be tedious and time-consuming for the user. And failure to authenticate from both applications can result in a limited overall experience for the user. For example, without proper authentication from one application, the user's experience from that application can be limited by access restrictions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for cross-application authentication on an online content management system. An online content management system can provide a user with a client-side application and a web interface for accessing features provided by the content management system. The client-side application can be installed at a client device and used to synchronize local content at the client device with the content management system. In addition, the client-side application can be used to access content hosted on the local content management system through an interface of the client-side application. The client-side application can also access restricted or account-specific content by authenticating with the content management system through a registered user account.

A web browser installed at the client device can also be used to access content and features at the content management system through a web interface (e.g., website). The web browser can authenticate with the content management system, through the web interface, to access restricted or account-specific content. Users at the client device can thus interact with the content management system through the client-side application and the browser application. A user can thus log into the content management system from the client-side application or the web browser at the client device.

If the user is not logged in through the client-side application, and runs the client-side application while the web browser is logged in, the client-side application can automatically log into the content management system. Here, the client-side application can log in with the credentials used by the web browser to log in, without requiring the user to re-enter the user credentials used to log in through the web browser.

For example, the web interface associated with the content management system can send a message to the client-side application to trigger the client-side application to initiate a login process. After receiving the message from the web interface, the client-side application can send a message to the web browser to trigger the web browser to open or launch a web page or tab. The message can contain a uniform resource locator (URL) and nonce to be used by the web browser in opening or launching the web page or tab and authenticating the client-side application. The nonce and/or URL can be obtained by the client-side application from the content management system. Moreover, the nonce can be associated with the client-side application. Accordingly, the content management system can know that the nonce is associated with that specific client-side application. Indeed, the nonce can identify or represent the client-side application at the content management system.

The web page or tab can be configured to communicate with the web interface and instruct the content management system to log in the client-side application with the account under which the web browser is currently logged in. In other words, the web page or tab can trigger the content management system to authenticate the client-side application using the credentials used by the web browser to authenticate a session between the web browser and web interface with the content management system. The web page or tab can run a command or script to communicate with the content management system, via the web interface, and instruct the content management system to authenticate the client-side application associated with the nonce under the user account used to authenticate a session between the browser application and web interface.

The content management system can receive the nonce and request to authenticate the client-application and perform the authentication of the client-side application. When performing the authentication, the content management system can identify, or verify the identity of, the client-side application based on the nonce. The content management system can then authenticate the client-side application under the user account currently authenticating the session between the web interface and browser application.

On the other hand, if the user is not logged in through the web browser, and tries to access restricted content from the web browser while the client-side application is logged in, the web browser can automatically log into the content management system. The web browser can log in with the user credentials used by the client-side application to log in, without requiring the user to re-enter the user credentials to log in through the web browser.

Here, when the web browser at the client device attempts to access content through a web interface associated with the content management system, the web interface can detect that the web browser is not authenticated (e.g., logged out) with the content management system. The web interface can obtain, from the client-side application, information about the account under which the client-side application is logged in. For example, the web interface can request, from the client-side application, an account identifier corresponding to a user account under which the client-side application is currently logged in. The web interface can prompt a user at the web browser to continue with the web browser session logged in with the account under which the client-side application is logged in. When the user selects at the web browser to continue with the web browser session logged in with the account, the web browser can send a command to the client-side application to initiate the log in process.

The client-side application can receive the command from the web browser and generate a local web page configured to log in the web browser under the account under which the client-side application is logged in. The client-side application can also send a command to the web browser to launch the local web page generated in order to log in the web browser under the account. For example, the client-side application can send an operating system (OS) command to the web browser instructing the web browser to open the local web page generated to log in the web browser.

The web browser can then open or launch the local web page, which can log in the web browser through the web interface with the account under which the client-side application is logged in. The web browser can open or launch the local web page as a separate tab on the web browser. Once the web browser is logged in, the web browser can close the separate tab and continue with the web session logged in with the account. If any other pages or tabs on the web browser are awaiting authentication, the web browser can also log in those pages or tabs and continue with those pages or tabs logged in with the account.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4B shows an example embodiment of a client application running in authenticated mode;

FIG. 4C shows another example embodiment of a client application and browser application running in an unsecure mode;

FIG. 6B shows a diagram of an example process for authenticating a browser application under a user account with which a client application has authenticated;

FIG. 8A shows a flowchart of an example method for authenticating a client application with credentials used by a browser application to authenticate with a content management system;

FIG. 8B shows a flowchart of an example method for authenticating a browser application with credentials used by a client application to authenticate with a content management system;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for cross-application authentication on an online content management system. An online content management system can provide a user with a client-side application and a web interface for accessing features provided by the content management system. The client-side application can be installed at a client device and used to synchronize local content at the client device with the content management system. The client-side application can also be used to access content hosted on the local content management system through an interface of the client-side application. A web browser installed at the client device can be used to access content and features at the content management system through a web interface (e.g., website). Users at the client device can thus interact with the content management system through the client-side application and the browser application.

A user can log into the content management system from the client-side application and/or the web browser at the client device. For example, the user can log into the content management system from the client-side application to interact with the content management system (e.g., upload content, synchronize content, access content, etc.) through the client-side application. Similarly, the user can log into the content management system from the web browser to access restricted or account-specific content and features through the web interface.

If the user is not logged in through the client-side application, and runs the client-side application while the web browser is logged in, the client-side application can automatically log into the content management system. The client-side application can log in with the credentials used by the web browser to log in, without requiring the user to re-enter the credentials used to log in through the web browser. Similarly, if the user is not logged in through the web browser, and tries to access restricted content from the web browser while the client-side application is logged in, the web browser can automatically log into the content management system. The web browser can log in with the credentials used by the client-side application to log in, without requiring the user to re-enter the user credentials used to log in through the client-side application.

Figure 1:
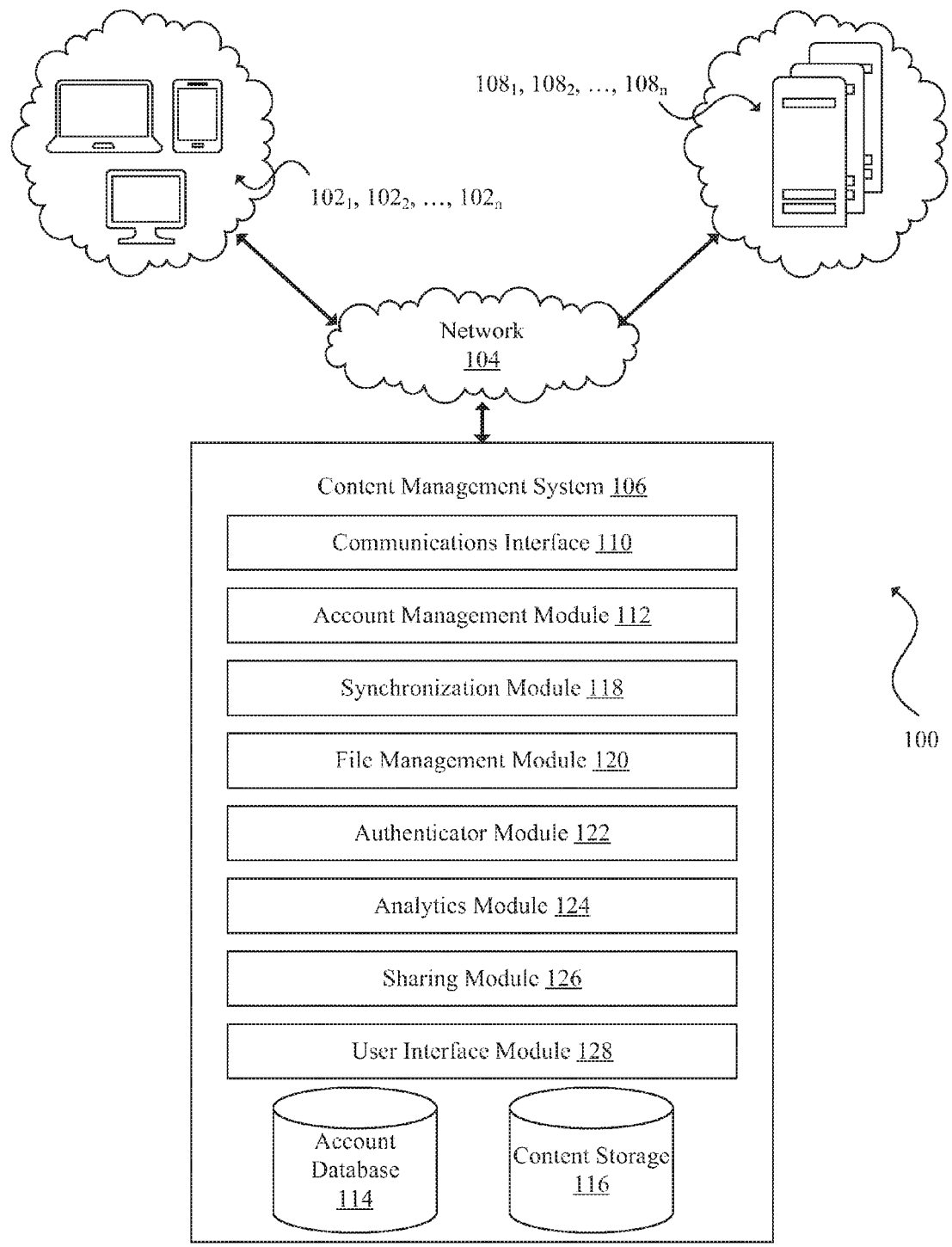
FIG. 1 shows an example configuration of devices and a network in accordance with various embodiments of the present technology.

With respect to implementing various embodiments of the disclosed technology, an example system configuration 100 is shown in FIG. 1, where electronic devices communicate via a network for purposes of exchanging content and other data. The system can operate in a wide area network (WAN), such as the Internet. However, the present principles are applicable to a wide variety of network configurations that facilitate the intercommunication of electronic devices. For example, each of the components of system 100 in FIG. 1 can be implemented in a localized or distributed fashion in a private network, and public network, or both.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

Content management system 106 can include one or more servers or devices. For example, content management system 106 can include a server or a cluster of servers and/or storage devices, for example. Each server within content management system 106 can include one or more modules (e.g., 110-128). For example, content management system 106 can include modules 110-128 in a single server and/or multiple servers.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102, and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102, can upload content to content management system 106 via network 104. The content can later be retrieved from content management system 106 using the same client device 102, or some other client device 102.

To facilitate the various content management services, a user can create an account with content management system 106. The account information can be maintained in user account database 114. User account database 114 can store profile information for registered users. In some cases, the only personal information in the user profile can be a username and/or email address. However, content management system 106 can also be configured to accept additional user information.

User account database 114 can also include account management information, such as account type, e.g. free or paid; usage information, e.g. file edit history; maximum storage space authorized; storage space used; content storage locations; security settings; personal configuration settings; content sharing data; etc. Account management module 112 can be configured to update and/or obtain user account details in user account database 114. The account management module 112 can be configured to interact with any number of other modules in content management system 106.

An account can be used to store content items, such as digital data, documents, text files, audio files, video files, etc., from one or more client devices 102 authorized on the account. The content items can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content items can be stored in content storage 116. Content storage 116 can be a storage device, multiple storage devices, or a server. Alternatively, content storage 116 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 116 can store content items using one or more partition types, such as FAT, FAT32, NTFS, EXT2, EXT3, EXT4, ReiserFS, BTRFS, and so forth.

Content storage 116 can also store metadata describing content items, content item types, and the relationship of content items to various accounts, folders, or groups. The metadata for a content item can be stored as part of the content item or can be stored separately. In one variation, each content item stored in content storage 116 can be assigned a system-wide unique identifier.

Content storage 116 can decrease the amount of storage space required by identifying duplicate files or duplicate segments of files. Instead of storing multiple copies, content storage 116 can store a single copy and then use a pointer or other mechanism to link the duplicates to the single copy. Similarly, content storage 116 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102, can include client software, which synchronizes, via a synchronization module 118 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content items that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 128. For example, the user can navigate in a web browser to a web address provided by content management system 106. Changes or updates to content in the content storage 116 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 110 for interfacing with various client devices 102, and can interact with other content and/or service providers $108_1$, $108_2$, . . . , $108_n$ (collectively "108") via an Application Programming Interface (API). Certain software applications can access content storage 116 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 116 through a web site.

Content management system 106 can also include authenticator module 122, which can verify user credentials, security tokens, API calls, specific client devices, and so forth, to ensure only authorized clients and users can access files. Further, content management system 106 can include analytics module 124 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 126 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 116. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 116. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry associated with the content item, thus granting the added user account access to the content item. Sharing module 126 can also be configured to remove user account identifiers from a content entry to restrict a user account's access to the content item.

To share content publicly, sharing module 126 can be configured to generate a custom network address, such as a uniform resource locator (URL), which allows any web browser to access the content in content management system 106 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2A:
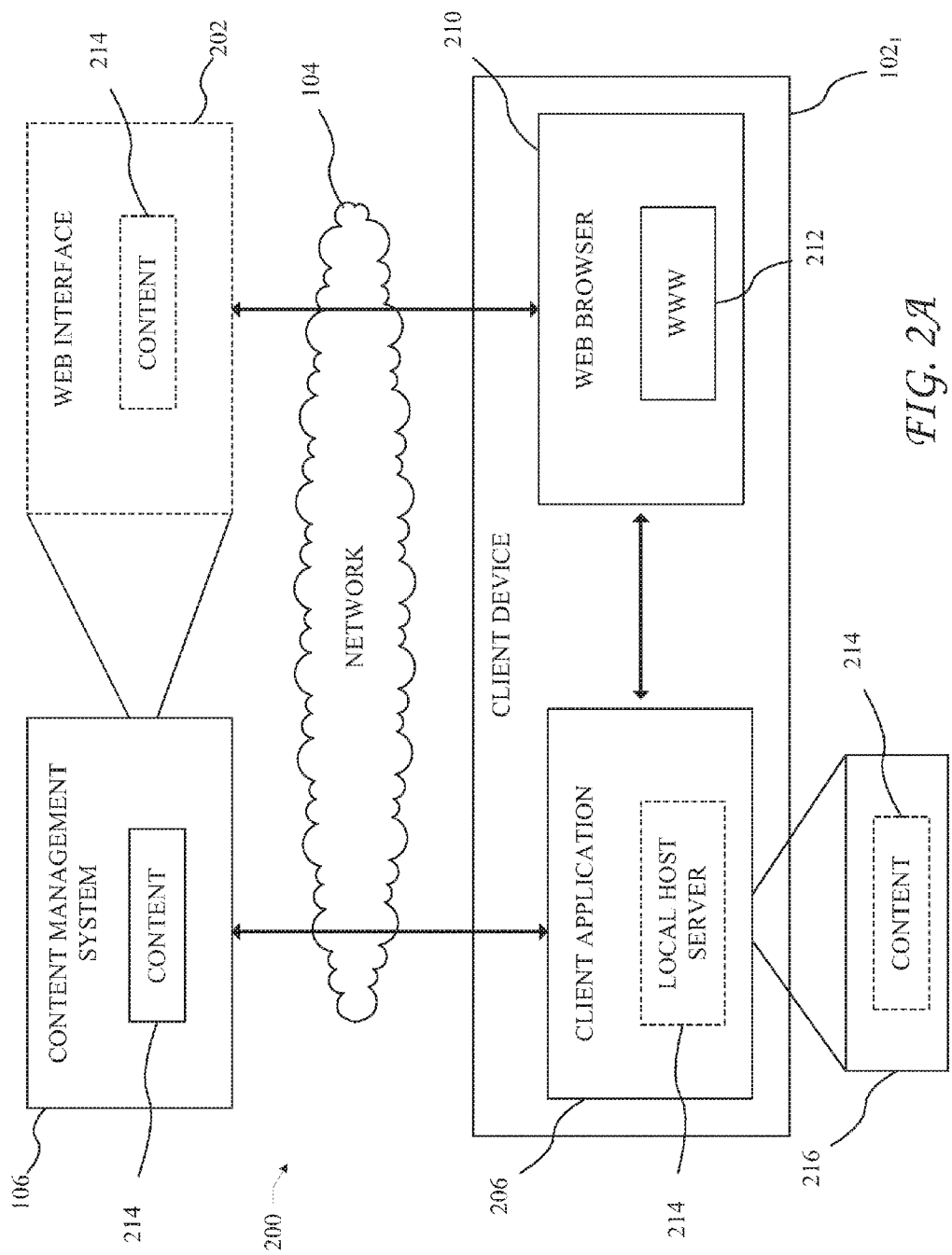
FIG. 2A shows a block diagram of an example communications environment for implementing various embodiments of the present technology.

FIG. 2A shows a block diagram of an example communications environment 200 for implementing various embodiments of the present technology. Client device $102_1$ can communicate with content management system 106, via network 104, to perform a login process, access content 214, and/or interact with content management system 106 and web interface 202. Web interface 202 can be a website associated with content management system 106. Web interface 202 can be hosted and managed by user interface module 122 on content management system 106.

Content management system 106 can maintain content 214 for users to access via client devices 102. Content 214 can include media files (e.g., photos, videos, audio, documents, and the like), links, profiles, webpages, and any other data. For example, content 214 can include webpage content provided by web interface 202, data associated with one or more user accounts registered at content management system 106, user account information (e.g., account details, profiles, account content, etc.), etc.

Client device $102_1$ can log in with content management system 106 using a user account registered with content management system 106, and/or access account content 214 on content management system 106. Content management system 106 can maintain one or more registered user accounts, which can be tied to individual users, clients, members, or subscribers that use services provided by content management system 106. User accounts can include information about respective users' profiles, credentials, synchronized data, membership information, etc. For example, content management system 106 can maintain user profiles (e.g., name, address, email address, phone number, user preferences, etc.), login credentials (e.g., username, password, security questions, cryptographic keys, etc.), synchronized data (e.g., files, folders, documents, etc.), membership information (e.g., date joined, membership tier, subscription status, billing information, standing, etc.), device information (e.g., client device identifiers, client device addresses, associated software applications, etc.), and so forth.

Client device $102_1$ can have client application 206 (also called, "client-side application," "desktop application," "mobile application," etc.) installed and running on client device $102_1$. Client application 206 can run on the client device's operating system (OS). For example, if client device $102_1$ runs a WINDOWS OS, client application 206 can be a WINDOWS application. In another example, if client device $102_1$ is mobile smartphone running iOS, client application 206 can be an iOS application. Users can download client application 206 from a website (such as a website from web interface 202) or an application marketplace, and install it on client device $102_1$.

Client application 206 can provide an interface for the user of client device $102_1$ to access content 214 on content management system 106, interact with content management system 106, and synchronize content 214 between content management system 106 and client device $102_1$. For example, client application 206 can provide an interface for user(s) at client device $102_1$ to register an account with content management system 106; log in with the registered account to content management system 106; create and access content (e.g., content 214) on content management system 106; upload content (e.g., content 214) to, and download content (e.g., content 214) from, content management system 106; synchronize data (e.g., content 214) with content management system 106; etc.

Client application 206 can also provide an interface for users to access and/or modify data and content on client device $102_1$. For example, client device $102_1$ can include content library 216, which can be accessed via client application 206. Content library 216 can include items from content 214 in content management system 106. Content library 216 can also include other content items, such as local files, links, documents, resources, or data. Client application 206 can interact with content library 216 to add, edit, delete, configure, or manage any portion of content library 216. Client application 206 can thus provide an interface for users to access content library 216 and content 214 on client device $102_1$. Client application 206 can also allow users to synchronize any portion of content library 216 and/or content 214 with content management system 106. Client application 206 can also allow users to view, modify, and delete any portion of content 214 on content management system 106, and/or synchronize any portion of content 214 from client device $102_1$ to content management system 106 and vice versa.

Client application 206 may include local host server 208 (e.g., a local web server). Local host server 208 can be part of client application 206, or can be a separate entity that exists outside client application 206. Local host server 208 can run web server software at client device $102_1$. Accordingly, client application 206 can, for example, host a local website (e.g., www.localhost.com) at client device $102_1$ through local host server 208. Moreover, local host server 208 can generate and/or service dynamic and static web documents to clients and/or applications. In some cases, a local website hosted by local host server 208 can be associated with a network address or domain (e.g., public address and domain name) for access by other devices and/or applications residing on remote devices.

Client device $102_1$ can also have browser application 210 installed and running on it. Browser application 210 allows a user to access web content (e.g., content 214) by fetching and rendering web documents according to various protocols and standards (e.g., web protocols, communication protocols, scripting language standards, content formats, content rendering standards, etc.). Moreover, browser application 210 can navigate and access documents on web interface 202. For example, browser application 210 can access website 212 through web interface 202, and render web pages from website 212 through browser application 210. Website 212 can include content 214 from content management system 106, and any other web content or features.

Browser application 210 may also access local content on client device $102_1$. For example, browser application 210 may access content from content library 216 and/or content associated with client application 206. Browser application 210 can also communicate with client application 206 and/or local host server 208 on client device $102_1$. For example, browser application 210 can establish a local communication channel to client application 206 and/or local host server 208 to exchange communications with client application $102_1$ and/or local host server 208. Browser application 210 can also establish a communication channel with web interface 202 and client application 206 through content management system 106, as further explained below with reference to FIG. 3.

Figure 2B:
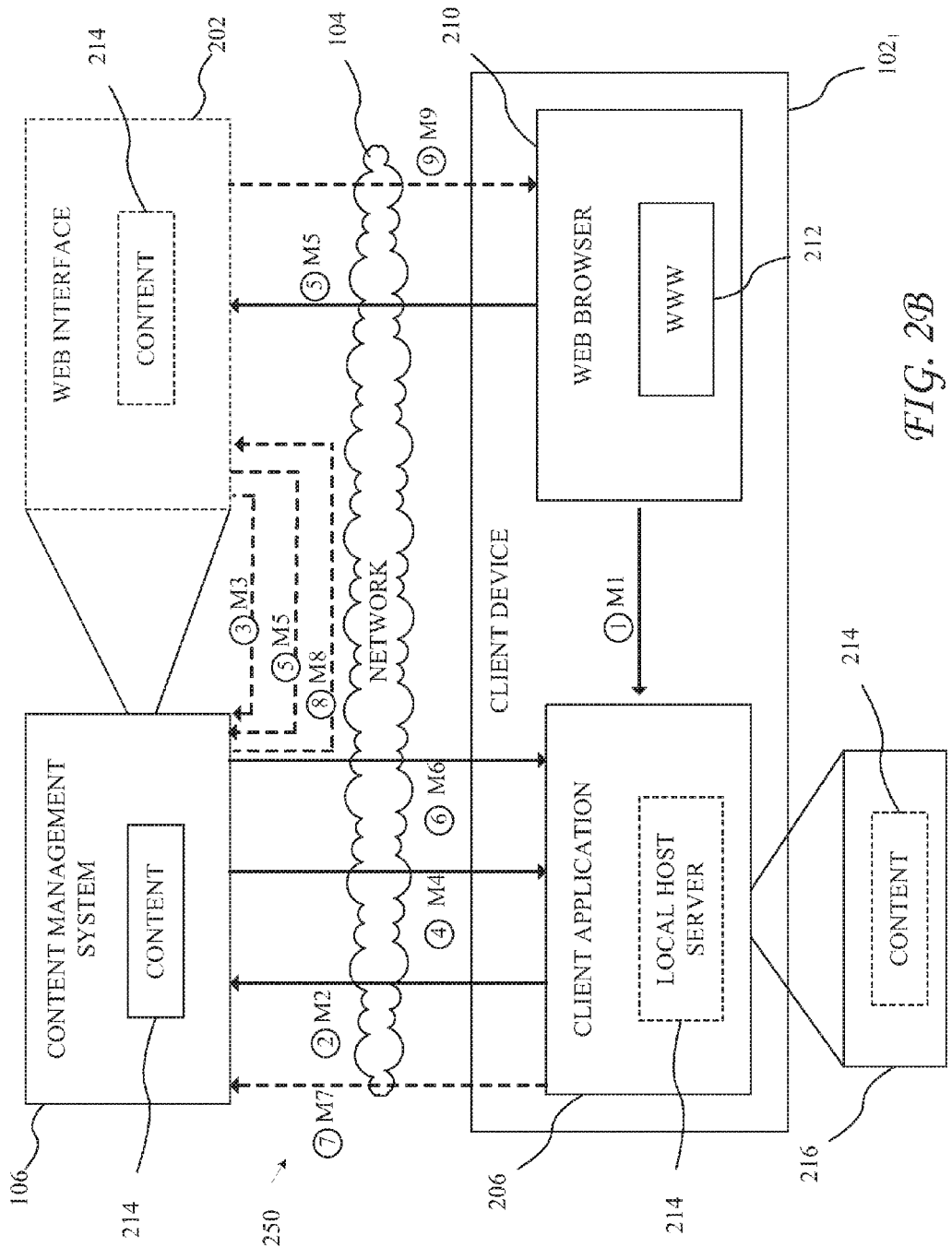
FIG. 2B shows a block diagram of an example communications protocol for implementing various embodiments of the present technology.

FIG. 2B shows a block diagram of an example communications protocol 250 for implementing various embodiments of the present technology. Communications protocol 250 can provide a mechanism for communications between various elements of content management system 106 and client device $102_1$ in environment 200. For example, communications protocol 250 can provide a mechanism for client application 206 to communicate with web interface 202 and/or browser application 210, and vice versa, via content management system 106.

For example, browser application 210 can send a message $M_1$ to client application 206. Browser application 210 can send message $M_1$ to client application 206 in a variety of different ways. For example, browser application 210 can send message $M_1$ to client application 206 and/or local host server 208 through a secure session request (e.g., SSL session request). As another example, browser application 210 can send message $M_1$ to client application 206 and/or local host server 208 through an OS message or command.

Message $M_1$ can include a nonce (e.g., random identifier, unique identifier, string, etc.) associated with web interface 202 and/or browser application 210. For example, message $M_1$ can include a nonce which identifies browser application 210 to web interface 202 and/or content management system 106. As another example, message $M_1$ can include a nonce which uniquely identifies a browser session between browser application 210 and web interface 202, to web interface 202 and/or content management system 106. The nonce can be passed within message $M_1$ as part of a request (e.g., secure session request), command, string, domain name or URL, etc. For example, the nonce can be passed within a URL or fully qualified domain name (FQDN) included in message $M_1$.

The nonce can be generated by browser application 210, web interface 202, or content management system 106. For example, the nonce can be generated by content management system 106 to identify client application 206, browser application 210 and/or a session between browser application 210 and web interface 202. As another example, the nonce can be generated by browser application 210 to identify browser application 210.

Client application 206 can receive message $M_1$ from browser application 210 and extract or identify the nonce in message $M_1$. For example, browser application 210 can send a secure session request to client application 206 or local host server 208, including message $M_1$. Client application 206 can then extract the nonce from the secure session request. In some cases, client application 206 can also respond to the secure session request. For example, client application 206 can extract the nonce but fail the connection requested in the secure session request.

Client application 206 can then send message $M_2$ to content management system 106. $M_2$ can include the nonce from $M_1$. Message $M_2$ can also provide an indication to content management system 106 that client application 206 is expecting a message from web interface 202 and/or browser application 210.

Content management system 106 can receive message $M_2$ from client application 206 and extract or identify the nonce in the message. As previously mentioned, the nonce can be based on, or associated with, browser application 210 and/or a session between browser application 210 and web interface 202. Thus, when content management system 106 receives the nonce from message $M_2$, it can use the nonce to associate client application 206 with browser application 210 and/or a session between browser application 210 and web interface 202. Based on the nonce, content management system 106 can map or associate client application 206 with browser application 210 and any sessions between browser application 210 and web interface 202. This mapping or association can be used by content management system 106 to relay communications between client application 206 and browser application 210 and/or web interface 202, as further explained below.

In addition, content management system 106 can receive message $M_2$ and maintain the connection or communication channel between content management system 106 and client application 206 open/accessible, or otherwise establish a new connection or channel between content management system 106 and client application 206. Content management system 106 can maintain or establish such connection or communication channel based on the nonce in message $M_2$ and/or an indication in message $M_2$ that client application 206 is expecting a message from browser application 210 and/or web interface 202.

Content management system 106 can then forward any messages from browser application 210 and/or web interface 202 to client application 206. For example, content management system 106 can receive message $M_3$ from web interface 202. Message $M_3$ can include the nonce and any message content. Content management system 106 can match the nonce in messages $M_2$ and $M_3$, and determine that the content of message $M_3$ can be relayed to client application 206. Content management system 106 can then send message $M_4$ to client application 206, which can be a forwarded copy of message $M_3$ or a new message including any portion of the content of message $M_3$.

As another example, browser application 210 can send message $M_5$ to web interface 202. Message $M_5$ can include the nonce as well as any content intended for client application 206. Web interface 202 can receive message $M_5$ and forward it (or any portion thereof) to content management system 106. Content management system 106 can receive message $M_5$ and extract or identify the nonce in the message. Content management system 106 can then determine that message $M_5$ can be relayed or forwarded to client application 206. For example, content management system 106 can match the nonce in message $M_5$ with the nonce in message $M_2$ from client application 206, to determine that client application 206 is associated with the nonce and can receive communications associated with the nonce.

Content management system 106 can then send message $M_6$ to client application 206. Message $M_6$ can be a forwarded copy of message $M_5$ or a new message including any portion of message $M_5$. Client application 206 can then receive message $M_6$ from content management system 106.

Client application 206 can also send a message $M_7$ to web interface 202 and/or browser application 210 through content management system 106. Message $M_7$ can include the nonce and any message content. Content management system 106 can receive message $M_7$ from client application 206 and extract or identify the nonce in the message. Content management system 106 can match the nonce with browser application 210 and/or a session between browser application 210 and web interface 202, to determine that message $M_7$ can be forwarded to browser application 210 and/or web interface 202. Content management system 106 can match the nonce with browser application 210 and/or a session between browser application 210 and web interface 202 based a respective, matching nonce associated with browser application 210 and/or the session between browser application 210 and web interface 202.

Based on the match, content management system 106 can send message $M_8$, including any portion of the message content of message $M_7$, to web interface 202. Web interface 202 can then extract and/or process any content of message $M_8$. If message $M_7$ is intended for browser application 210, web interface 202 can send message $M_9$, which can be a forwarded copy of message $M_7$ or a new message including any portion of the message $M_7$, to browser application 210.

In this way, client application 206 can exchange communications with browser application 210 and/or web interface 202 through content management system 106. Content management system 106 can use the nonce to relay messages between client application 206 and browser application 210 or web interface 202. In particular, content management system 106 can use the nonce to identify the appropriate target recipients of messages to be relayed by content management system 106.

Content management system 106 can also use the nonce to distinguish between different client applications, web sessions, and/or browser applications when relaying messages or communications. For example, if several client and browser applications on several client devices 102 are authenticated or registered with content management system 106 using a same account, content management system 106 can use nonces to identify which specific client application or browser application should receive a message. To illustrate, content management system 106 can determine that a message from web interface 202 should be relayed to client application 206, as opposed to another client application authenticated or registered with content management system through the same account, by associating the nonce received in the message from web interface 202 with the nonce received from client application 206.

Communications protocol 250 can also help content management system 106 avoid certain security problems, such as spoofing, when communicating messages to client application 206 and browser application 210. For example, say user A logs into content management system 106 using a client application at client device A. User A later leaves client device A and uses a client application at client device B to access content on content management system 106. User A also establishes a session with web interface 202 using a browser application at client device B. If content management system 106 receives a message from the browser application at client device B and forwards the message to the client application at client device A, the message may reach an unintended user who now has access to client device A. Moreover, content management system 106 may not know which of the client applications should receive the message from the browser application at client device B.

With communications protocol 250, content management system 106 can associate the client application at client device B with the browser application at the client device B based on the nonce. Thus, when content management system 106 receives a message including a nonce from the browser application at client device B, it can determine that the message should be relayed to the client application which reported the same nonce (e.g., client application at client device B). Accordingly, content management system 106 can determine that the client application at client device B has reported the same nonce, and select the client application at client device B, as opposed to any other client application at any other device, to receive the message from the browser application at client device B.

As a security measure, content management system 106 or client device $102_1$ can also check that the process of client application 206 and the process of browser application 210 at client device $102_1$ are associated with, or owned by, the same OS user. For example, before relaying a message between client application 206 and browser application 210, content management system 106 can verify that client application 206 and browser application 210 are running at client device $102_1$ under the same OS username. This way, content management system 106 can increase the likelihood that client application 206 and browser application 210 are running on the same device and any corresponding messages are being received by content management system 106 from the same device. Accordingly, content management system 106 can identify security issues, such as spoofing attempts, and flag or filter messages accordingly using information about the processes and usernames running the client and browser applications.

Figure 3A:
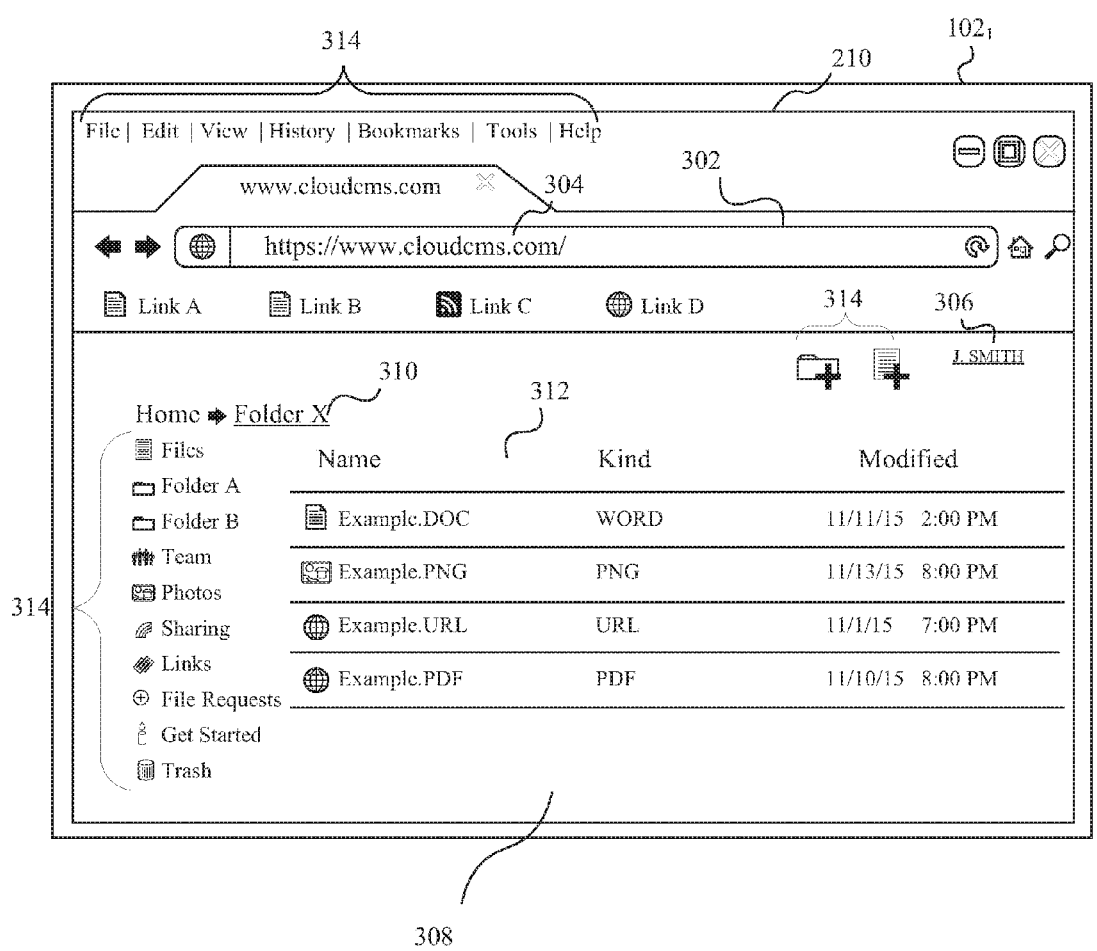
FIG. 3A shows an example browser interface for interacting with a content management system through a browser application.

FIG. 3A shows an example browser interface 300 for interacting with content management system 106 through browser application 210. Browser application 210 can navigate to address 304 via navigation bar 302 on browser application 210, to load and present web page 308 on browser application 210. Navigation bar 302 allows the user to enter network addresses and URLs for navigating and rendering network and Internet content through browser application 210. Browser application 210 can also navigate to web page 308 in response to receiving a command or a selection of a link that directs browser application 210 to address 304.

Web page 308 can be hosted on a website associated with content management system 106. For example, web page 308 can present content stored on, and features provided by, content management system 106 through web interface 202. The content and features provided on web page 308 can be specific to user account 306 registered with content management system 106. Thus, to access web page 308, browser application 210 can perform an authentication process with content management system 106 to authenticate (e.g., log in) user account 306 with content management system 106.

To authenticate browser application 210 with content management system 106 for user account 306, the user can enter credentials for user account 306 (e.g., username, password, etc.) from browser application 210. Content management system 106 can receive the credentials and authenticate browser application 210 for user account 306 once the received credentials are validated. However, as explained below with reference to FIGS. 4-9, if client application 206 is authenticated with content management system 106 through user account 306, browser application 210 can also authenticate with content management system 106 through user account 306 without requiring the user to re-enter the credentials for user account 306 from browser application 210.

In some cases, if browser application 210 is not authenticated with content management system 106, the user may still navigate and access content and features on content management system 106 (e.g., via web interface 202) from browser application 210. For example, the user may access other content or features on content management system 106 even if user account 306 is signed off or logged out. However, the content and features accessible from browser application 210 while browser application 210 is not authenticated with content management system 106 may differ (e.g., browser application 210 may have limited access to content and features on content management system 106).

As previously noted, web page 308 can provide an interface for the user to interact with content and features associated with user account 306 from browser application 210. To this end, web page 308 can include menu items 314 where the user can select a feature, such as a command or navigation link, from a variety of available options or menus (e.g., "Files," "Folders," "Photos," "Sharing," "Links," "Create new folder," "Create new document," "Delete file," etc.). Web page 308 can also feature content display area 312, where the user can access various files and/or folders (e.g., "Folder A," Folder B," "Example.DOC," "Example.PNG," etc.). Content display area 312 can include content and features associated with user account 306 on content management system 106.

In particular, content display area 312 can include various types of files and folders, such as archives, compressed folders, image files, video files, text files, audio files, and/or any other type of folder or data file. The content in display area 312 can be associated with folder 310. For example, the content in content display area 312 can include items contained in folder 310. Folder 310 can be a folder hosted on content management system 106 and accessible via web page 308.

Folder 310 can be listed or identified on web page 308 to allow the user know which folder web page 308 is displaying or browsing. Folder 310 can also be listed with an indication of the location of folder 310 relative to other folders or web pages, such as a home screen or a root folder. The location of folder 310 can be displayed according to a specific hierarchy or directory structure of the user's content on the website hosting web page 308 and/or content management system 106.

The user can remove selected items in content display area 312 via browser application 210. For example, the user can select an item in content display area 312 and delete the item so that the item is no longer stored on content management system 106 or presented in content display area 312 of web page 308. The user can also add or upload (e.g., copy and paste, drag and drop, browse and attach, etc.) items, such as files or folders, to content display area 312 via browser application 210. To illustrate, a user can upload file "Example.PDF" to content display area 312 using browser application 210.

The user can also add or upload links or link files to content display area 316 from client application 206. For example, the user can upload a file or folder from client application 206 to a folder or location on client device $102_1$ corresponding to content display area 312, such as a folder containing items to be synchronized with content management system 106 and presented in content display area 312 of web page 308. Client application 206 can upload a file or folder to content management system 106 by, for example, synchronizing or transferring contents from a specific folder on client device $102_1$ to a corresponding folder or location on content management system 106.

Figure 3B:
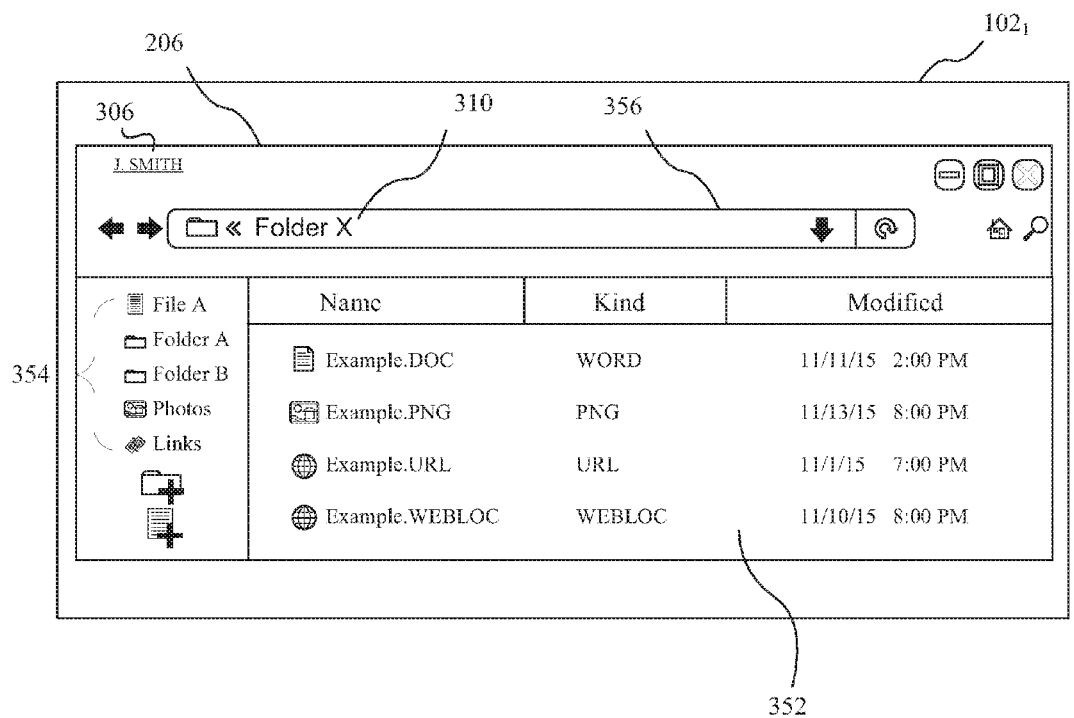
FIG. 3B shows an example interface for interacting with content through a client application.

To illustrate, referring to FIG. 3B, client application 206 can provide interface 350 for accessing and modifying content on folder 310. Folder 310 can be hosted locally on client device $102_1$. Folder 310 can also be hosted on content management system 106. Moreover, client application 206 can synchronize folder 310 on client device $102_1$ with folder 310 on content management system 106. Thus, content changes made to folder 310 from client application 206 can be propagated to content management system 106 and reflected in content display area 312 of web page 308 when the user navigates to address 304 from browser application 210.

Interface 350 can feature menu items 354 for navigating to different folders from client application 206. Interface 350 can also include navigation bar 356 for navigating a path (e.g., file or folder path) or a directory structure of files and folders. The user can thus navigate to folder 310 associated with web page 308 through navigation bar 356 or menu items 354.

When the user navigates to folder 310 from client application 206, interface 350 can access the content associated with folder 310. The content associated with folder 310 can be stored on content management system 106 but can also be stored locally on client device $102_1$. For example, the content associated with folder 310 can be stored on a local instance of folder 310 and synchronized or copied to another instance of folder 310 on content management system 106.

Content display area 352 on interface 350 can present content associated with folder 310. Moreover, content display area 352 on interface 350 can be synchronized with content display area 312 on web page 308. Thus, content display area 352 on interface 350 can include the same content items as content display area 312 on web page 308.

The user can add or remove files and folders to content display area 352 via client application 206. For example, the user can copy or upload a file from client device $102_1$ to folder 310 on client device $102_1$ or directly to content display area 352. As another example, the user can delete a folder or file displayed in content display area 352 to remove the folder or file from folder 310.

Content items, such as files and folder, added to, or removed from, content display area 352 can be automatically uploaded to content management system 106. Such changes can also be automatically reflected on content display area 312 of web page 308. For example, changes made to content display area 352, such as uploading and deletion of items, can be synchronized between folder 310 on client device $102_1$ and content management system 106. Thus, when a user navigates to folder 310 (e.g., via web page 308 or interface 350), content changes made to content display area 352 from client application 206 can be reflected in folder 310 (e.g., via content display area 312 or content display area 352).

In order to synchronize content from folder 310 on client device $102_1$ to folder 310 on content management system 106 or otherwise interact with content management system 106 from client application 206, the user can log in or authenticate client application 206 with content management system 106. The user can log in or authenticate client application 206 for user account 306. For example, the user can enter credentials for user account 306 (e.g., username, password, etc.) from client application 206, to authenticate client application 206 with content management system 106 for user account 306. Content management system 106 can receive the credentials and authenticate client application 206 for user account 306 once the received credentials are validated.

However, as explained below with reference to FIGS. 4-9, if browser application 210 is authenticated with content management system 106 through user account 306, client application 206 can also authenticate with content management system 106 through user account 306 without requiring the user to re-enter the credentials for user account 306 from client application 206.

Figure 4A:
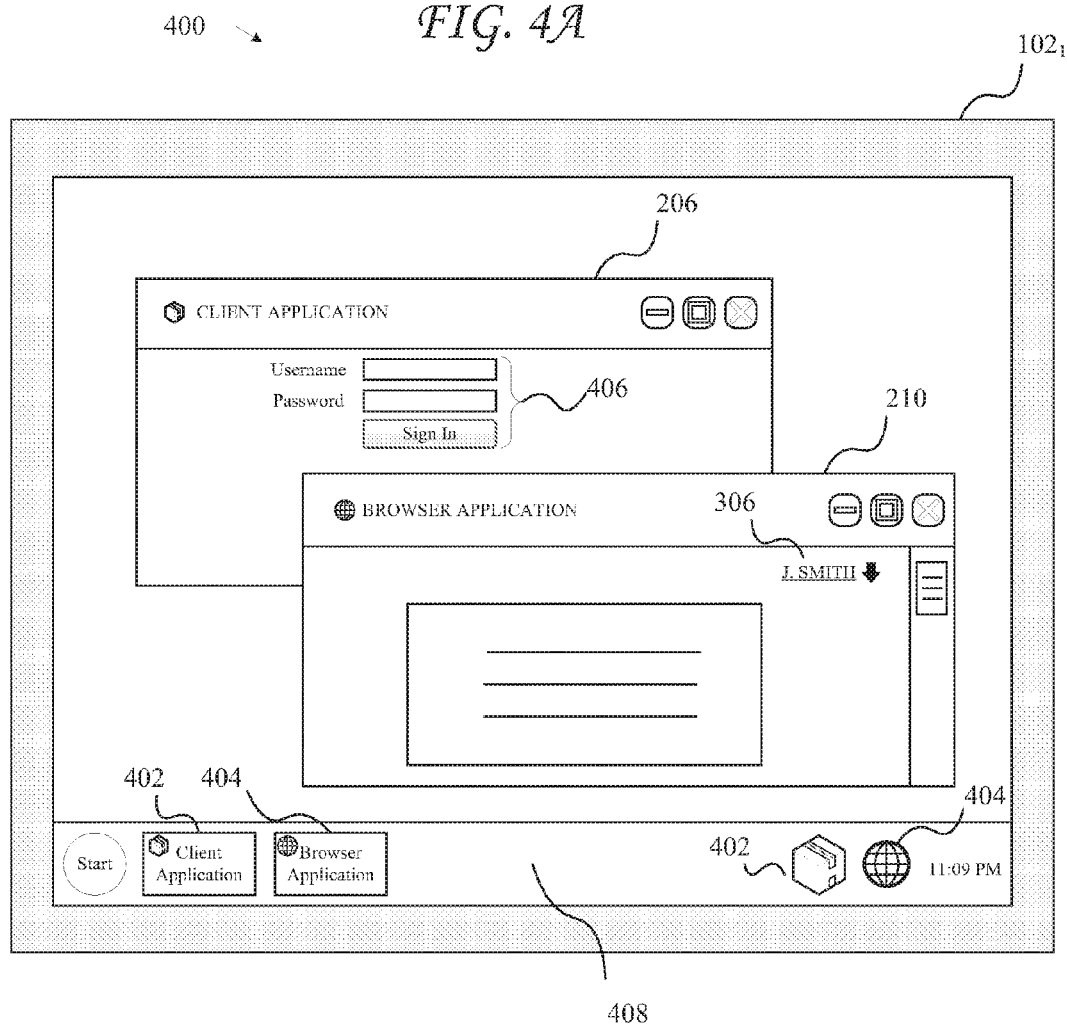
FIG. 4A shows an example embodiment of a browser application running and client application running in an unsecure mode.

FIG. 4A shows an example embodiment 400 of browser application 210 and client application 206 running in an unsecure mode. The unsecure mode can be an insecure client mode. Here, browser application 210 is running in authenticated mode while client application 206 is running in unauthenticated mode. In insecure client mode, browser application 210 may not trust client application 206 because client application 206 is running in unauthenticated mode.

To run in authenticated mode, browser application 210 can sign into user account 306 by transmitting credentials for user account 306 to content management system 106. Browser application 210 can communicate the relevant credentials to content management system 106 through web interface 202. Content management system 106 can receive the credentials and authenticate browser application 210 under user account 306 once the credentials are validated. Once browser application 210 has been authenticated by content management system 106 under user account 306, it can run in authenticated mode under user account 306.

Client device $102_1$ can display browser instance 404 in toolbar 408 to indicate that browser application 210 is running on client device $102_1$. The user can interact with browser application 210 through browser instance 404. For example, the user can select browser instance 404 to view account status or details, change or verify settings, close browser application 210, log off user account 306, etc.

Client application 206 can run in unauthenticated mode when content management system 106 has not authenticated client application 206 under any user account. Client device $102_1$ can also display client application instance 402 in toolbar 408 to indicate that client application 206 is running on client device $102_1$. The user can also interact with client application 206 through client application instance 402. For example, the user can select client application instance 402 to view account status or details (e.g., login status), change or verify settings, close client application 206, log off user account 306 (if current logged in), etc.

Client application 206 can also feature authentication prompt 406 to allow a user to manually enter credentials to authenticate with content management system 106. The user can enter and submit credentials through authentication prompt 406, to authenticate client application 206 under a specific user account.

However, client application 206 can also authenticate with content management system 106 under user account 306 when browser application 210 is currently authenticated under user account 306, without requiring the user to enter credentials and authenticate through authentication prompt 406. For example, client application 206 can automatically authenticate with content management system 106 using the credentials provided by browser application 210 to authenticate user account 306. As further explained in FIGS. 6-9, client application 206 can trigger browser application 210 to authenticate client application 206 with content management system 106 under user account 306.

FIG. 4B shows an example embodiment 420 of browser application 210 and client application 206 running in authenticated mode. Client application 206 can authenticate under user account 306 to run in authenticated mode. Client application 206 can automate the authentication process under user account 306 when browser application 210 is authenticated under user account 306. As explained further below, client application 206 can trigger browser application 210 to authenticate client application 206 under user account 306.

Once client application 206 authenticates with content management system 106, browser application 210 and client application 206 can run in secure mode. Secure mode allows browser application 210 and client application 206 to trust each other. Further, by running browser application 210 and client application 206 in authenticated mode, the user can interact with content management system 106 through both applications and their respective interfaces. Moreover, browser application 210 and client application 206 can seamlessly interact with content management system 106 and each other to provide a better experience for the user.

FIG. 4C shows an example embodiment 440 of client application 206 and browser application running in an insecure mode. The unsecure mode can be an insecure browser mode. Here, browser application 210 is running in unauthenticated mode while client application 206 is running in authenticated mode. In insecure browser mode, client application 206 may not trust browser application 210 because browser application 210 is running in unauthenticated mode. However, browser application 210 can authenticate based on credentials used by client application 206 in order to run in secure mode, as further described below.

To run in authenticated mode, client application 206 can authenticate with content management system 106 under user account 306. Once content management system 106 authenticates or validates the credentials provided by client application 206 for user account 306, client application 206 can interact with content management system 106 in authenticated mode.

Browser application 210 can run in unauthenticated mode when content management system 106 has not authenticated browser application 210 under any user account. When running in unauthenticated mode, browser application 210 can feature authentication prompt 410 to allow a user to manually enter credentials to authenticate with content management system 106. The user can enter and submit credentials through authentication prompt 410, to authenticate browser application 210 under a specific user account.

However, as previously mentioned, browser application 210 can also authenticate with content management system 106 under user account 306 if client application 206 is authenticated under user account 306, without requiring the user to enter credentials and authenticate through authentication prompt 410. For example, browser application 210 can automatically authenticate with content management system 106 using the credentials provided by client application 206 to authenticate user account 306. As further explained in FIGS. 6-9, browser application 210 can information about user account 306 authenticated under client application 206, and request content management system 106 to authenticate browser application 210 under user account 306.

Figure 4D:
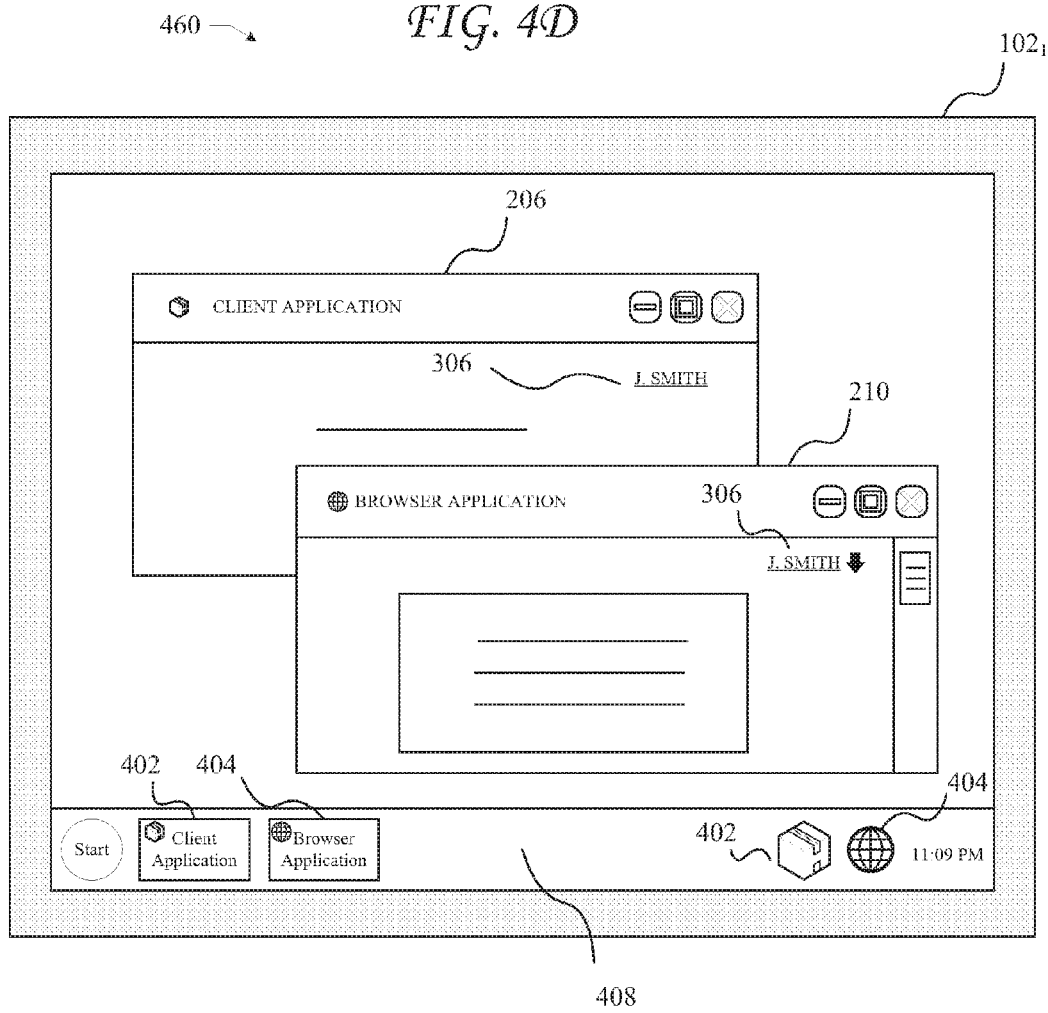
FIG. 4D shows an example embodiment of a browser application running in authenticated mode.

FIG. 4D shows an example embodiment 460 of browser application 210 running in authentication mode after authenticating with content management system 106 under user account 306 used by client application 206. Browser application 210 and client application 206 can run in secure mode after both being authenticated by content management system 106 under user account 306.

Figure 5A:
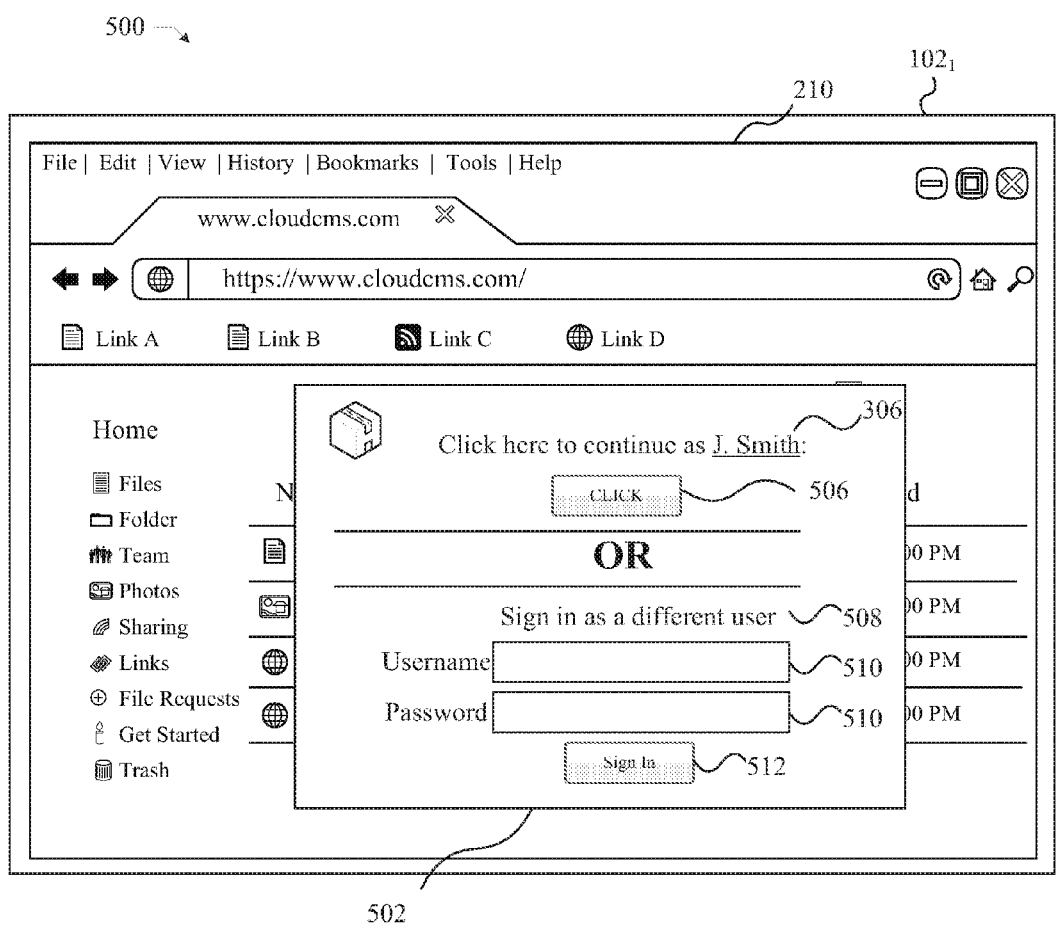
FIG. 5A shows an example interface for authenticating a browser application without entering credentials.

FIG. 5A shows an example interface 500 for authenticating browser application 210 under user account 306 without entering credentials. Browser application 210 can display prompt 502 when running in unauthenticated mode to prompt the user to authenticate browser application 210.

Browser application 210 can display prompt 502 in response to a triggering event, such as an attempt to access restricted content, an attempt to navigate to a restricted page, an attempt to invoke a restricted operation, an attempt to use a restricted feature, etc. For example, if, while browser application 210 is running in unauthenticated mode, the user tries to perform an operation from browser application 210 which requires browser application 210 to be authenticated, browser application 210 can display prompt 502 to allow the user to authenticate in order to perform the operation.

Operations which require browser application 210 to be authenticated with content management system 106 can vary. Non-limiting examples include selecting a link to restricted content, posting a comment on a page, uploading an item to a restricted location, removing an item, accessing shared content, navigating to a restricted page, interacting with account-specific features or content, etc. Thus, when the user attempts to perform an operation from browser application 210 which requires authentication, browser application 210 can display prompt 502 to continue with an authentication process.

If the user is already authenticated in client application 206 under user account 306, prompt 502 can ask the user if he or she wishes to continue under user account 306. For example, browser application can display the username associated with user account 306 and ask the user if he or she wishes to continue the browsing session logged in as the username of user account 306. Prompt 502 can include control element 506 which the user can select to automatically authenticate browser application 210 under user account 306 to continue the browser session under user account 306. When the user selects control element 506, browser application 210 can automatically authenticate with content management system 106 under user account 306 as further explained below with reference to FIGS. 6-9. This way, the user can skip through the sign-in process and continue with the browser session authenticated with the same credentials as client application 206.

Prompt 502 can include features 508-512 to allow a user to manually enter credentials to authenticate browser application 210 with content management system 106. Features 508-512 can enable the user to enter credentials for a different user account if the user wishes to authenticate browser application 210 under a different account.

Figure 5B:
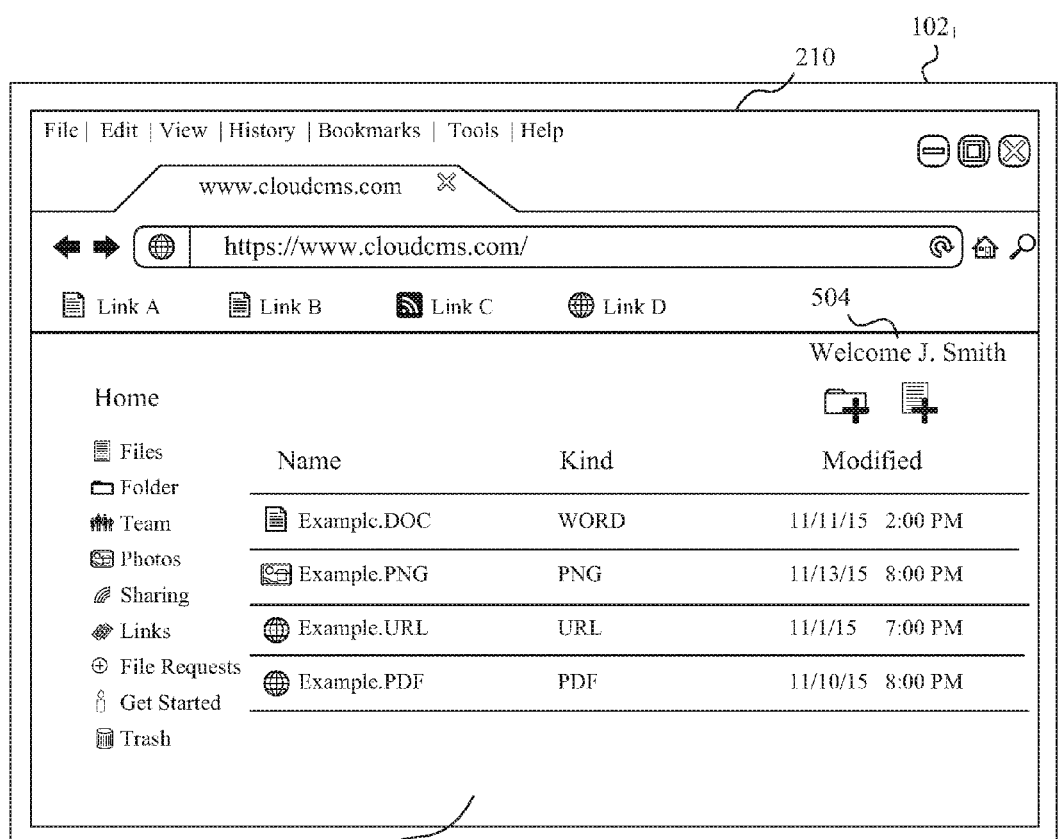
FIG. 5B shows an example web page provided by a browser application running in authenticated mode.

Referring to FIG. 5B, browser application 210 can continue to web page 520 after authenticating with content management system 106. For example, after the user selects control element 506, browser application 210 can authenticate with content management system 106 under user account 306 and proceed to web page 520. Web page 520 can include message 504 indicating to the user that browser application 210 has been authenticated with content management system under user account 306.

Figure 6A:
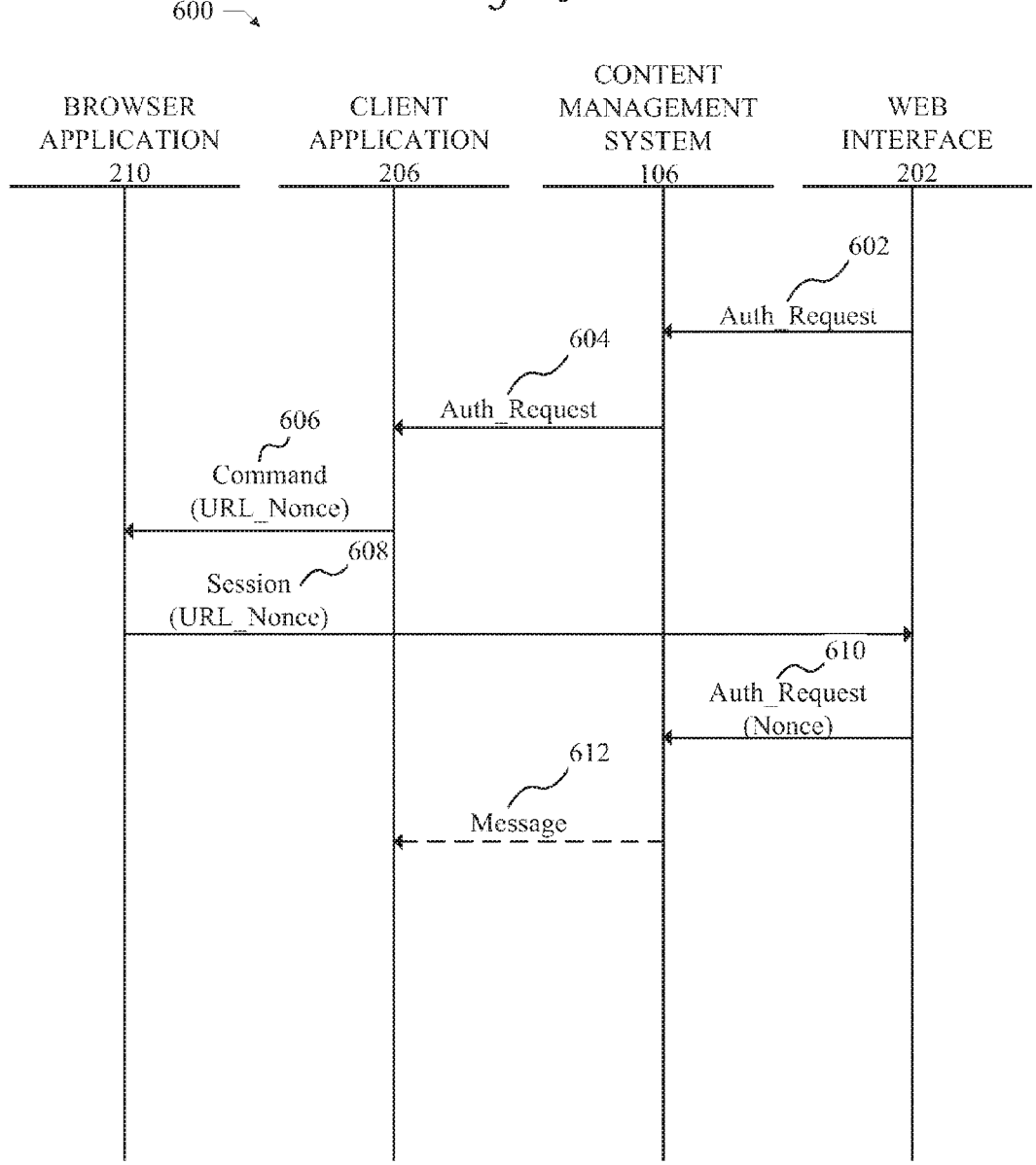
FIG. 6A shows a diagram of an example process for authenticating a client application under a user account with which a browser application has authenticated.

FIG. 6A shows a diagram of an example process 600 for authenticating client application 206 under a user account with which browser application 210 is authenticated. To initiate process 600, web interface 202 can send authentication request 602 to content management system 106, to be relayed to client application 206. Web interface 202 can send authentication request 602 to client application 206, through content management system 106, based on communications protocol 250 described above with reference to FIG. 2B. Moreover, prior to sending authentication request 602, content management system 106 can establish a communication handshake with client application 206 and web interface 202 as further described with reference to FIG. 9.

Web interface 202 can send authentication request 602 after determining that client application 206 is running in unauthenticated mode, and browser application 210 is running in authenticated mode. Authentication request 602 can thus notify client application 206 to initiate authentication based on the credentials used by browser application 210 to authenticate a current session with content management system 106.

Content management system 106 can receive authentication request 602 and send authentication request 604 to client application 206. Authentication request 604 can be a copy or include a portion of authentication request 602. Content management system 106 can identify client application 206 as the proper recipient for authentication request 604 based on a reference in authentication request 602 of a nonce associated with client application 206. For example, authentication request 602 can include a nonce that matches another nonce which content management system 106 previously received from client application 206.

Client application 206 can receive authentication request 604 and thereafter initiate an authentication process to log in using the credentials which browser application 210 used to authenticate a current session. To this end, client application 206 can send command 606 to browser application 210. Client application 206 can send command 606 to browser application 210 as an operating system (OS) command, for example.

Command 606 can trigger browser application 210 to log in client application 206 under the user account with which browser application 210 is currently authenticated. For example, command 606 can include an instruction for browser application 210 to open a browser page (e.g., window, tab, session, etc.) configured to run a command or script to ask content management system 106 to authenticate client application 206 under the same user account that browser application 210 is currently authenticated.

Command 606 can include an address, such as a URL, which browser application 210 can use when opening the page for authenticating client application 206 with content management system 106. Command 606 can also include a nonce associated with client application 206. The nonce can associate or identify the authentication request from browser application 210 to content management system 106 as corresponding to client application 206. The nonce can be a string or identifier, such as a random identifier, for example. Content management system 106 can use the nonce to identify client application 206 from other client applications. For example, content management may be aware of, or communicate with, numerous client applications at different client devices 102. Since the nonce can be associated with client application 206 at client device $102_1$, content management system 106 can use the nonce to identify client application 206 on client device $102_1$ specifically from other client applications on other devices.

In some cases, the nonce can be included in the address contained in command 606. For example, the nonce can be included in part of a URL contained in command 606. To illustrate, the URL can include a host, such as localhost, and a path or filename containing a value of the nonce, which can be separated from the host by a slash (e.g., http://localhost.com/nonce). As one of ordinary skill in the art will recognize, the URL can also include other portions, such as protocol, port, user, password, query string, etc.

After receiving command 606, browser application 210 can establish browser session 608 with web interface 202. Browser session 608 can be based on the URL and nonce in command 606. For example, browser application 210 can use the URL and nonce to communicate with web interface 202. Browser session 608 can trigger a command or script to cause web interface 202 to send authentication request 610 to content management system 106. Authentication request 610 can instruct content management system 106 to authenticate client application 206 with the same credentials used to authenticate a current session between browser application 210 and web interface 202 with content management system 106.

Web interface 202 can obtain the nonce associated with client application 206 from browser session 608. Web interface 202 can also include the nonce in authentication request 610 to content management system 106. Content management system 106 can use the nonce in authentication request 610 to associate authentication request 610 with client application 206.

Content management system 106 can receive authentication request 610 and authenticate client application 206 under the same user account used to authenticate browser application 210. For example, content management system 106 can validate the credentials used by web interface and/or browser application 210 to authenticate browser application 210, and establish an authenticated session with client application 206.

In some cases, content management system 106 can send message 612 to client application 206, informing client application 206 that content management system 106 has authenticated client application 206.

FIG. 6B shows a diagram of an example process 650 for authenticating browser application 210 under a user account with which client application 206 is authenticated. To initiate process 650, web interface 202 can send request 652 to content management system 106, to be relayed to client application 206. Web interface 202 can send request 652 to client application 206, through content management system 106, based on communications protocol 250 described above with reference to FIG. 2B. Moreover, prior to sending request 652, content management system 106 can establish a communication handshake with client application 206 and web interface 202 as further described with reference to FIG. 9.

Request 652 can request information from client application 206 about a user account with which client application 206 is logged in or authenticated. For example, request 652 can ask client application 206 for a username or identifier corresponding to the user account under which client application 206 has logged in with content management system 106. Request 652 can be sent to client application 206 in order to obtain account information from client application 206 for initiating a process to authenticate browser application 210 under the same user account.

Web interface 202 can send request 652 based on a determination that client application 206 is authenticated and browser application 210 has attempted to interact with web interface 202 in unauthenticated mode. For example, web interface 202 can generate request 652 when it determines that client application 206 is authenticated and browser application 210 has attempted to access restricted or account-specific content or features while running in unauthenticated mode. Request 652 can thus initiate a process for browser application to authenticate under the same user account as client application 206 in order to interact with web interface 202 in authenticated mode.

Content management system 106 can receive request 652 and send request 654 to client application 206. Request 654 can be a copy, or include a portion, of request 652. For example, request 654 can be a message forwarding request 652 from web interface 202 to client application 206.

Client application 206 can receive request 654 from content management system 106 and send reply 606 back to web interface 202 through content management system 106. Reply 606 can include user account information from client application 206, such as a username or user account identifier.

Content management system 106 can receive reply 606 and send reply 608, including the account information from reply 606, to web interface 202. Web interface 202 can receive reply 608 and send prompt 610 to browser application 210. Prompt 610 can include a prompt to the user to continue with a browser session on browser application logged in as the user or user account identified in the account information in reply 608. For example, web interface 202 can extract a username or account identifier from reply 608 and provide the extracted username or account identifier in prompt 610, as illustrated in FIG. 5A. Prompt 610 can include a control element, such as control element 506 in FIG. 5A, configured to receive input from the user through browser application 210. The input received from the user through the prompt 610 can trigger browser application 210 to send command 612 to client application 206.

Command 612 can include an instruction for client application 206 to initiate authentication of browser application 210. Client application 206 can receive command 612 and issue command 614 to browser application 210. Command 614 can include an instruction for browser application 210 to open a web page or web page file (e.g., HTML file) configured to authenticate browser application 210 with content management system 106. The web page or web page file can be a local web page or local web page file hosted on client device 102₁. Moreover, the web page or web page file can include a script for authenticating browser application 210 under the user account identified in the account information in reply 608.

In some cases, client application 206 can send command 614 to browser application 210 as an OS command. For example, client application 206 can send an OS command instructing browser application 210 to open a local web page on client device 102₁.

Browser application 210 can receive command 614 and open the web page or web page file for authenticating browser application 210 under the user account identified in the account information in reply 608. Browser application 210 can thus send authentication request 616 to web interface 202 through the web page or web page file opened by browser application 210 in response to command 614. In some cases, authentication request 616 can be automatically generated by a script executed when browser application 210 opens the web page or web page file.

Web interface 202 can pass authentication request 618 on to content management system 106. Content management system 106 can receive authentication request 618 and authenticate browser application 210 under the user account identified in reply 608. In some cases, once browser application 210 is authenticated, browser application 210 can present a notification for the user that browser application 210 has successfully authenticated under the specific user account.

If browser application 210 has an unauthenticated session with web interface 202 open, browser application 210 can refresh the session to continue under the authenticated user account. For example, if browser application 210 has an open browser window or tab that is unauthenticated (e.g., a browser tab that triggered web interface 202 to issue request 652 initiating the authentication of browser application 210), browser application 210 can log in the open browser window or tab under the authenticated user account and continue the browser session in authenticated mode.

Figure 7:
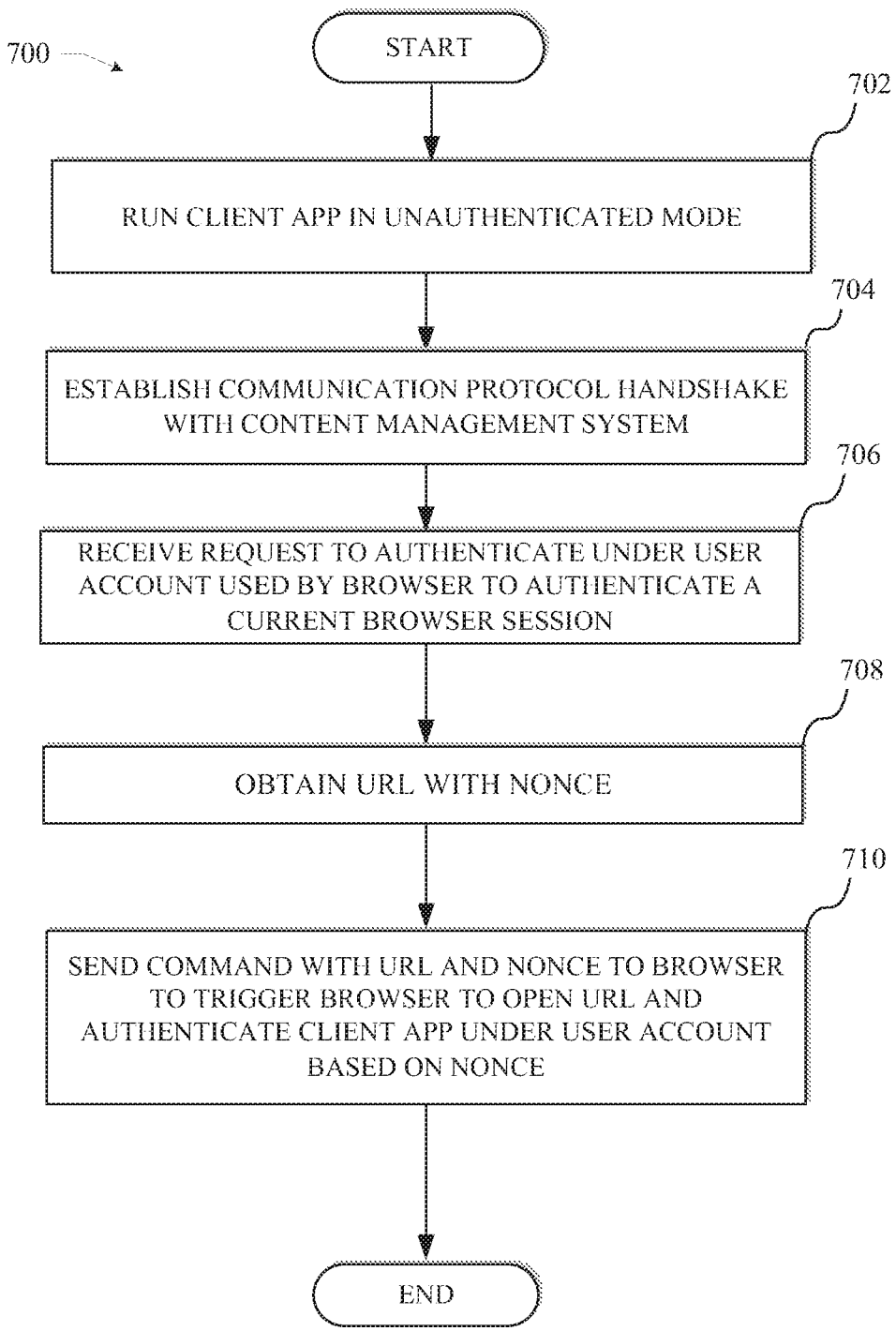
FIG. 7 shows an example method for authenticating a client application under a user account with which a browser application has authenticated.
Figure 9:
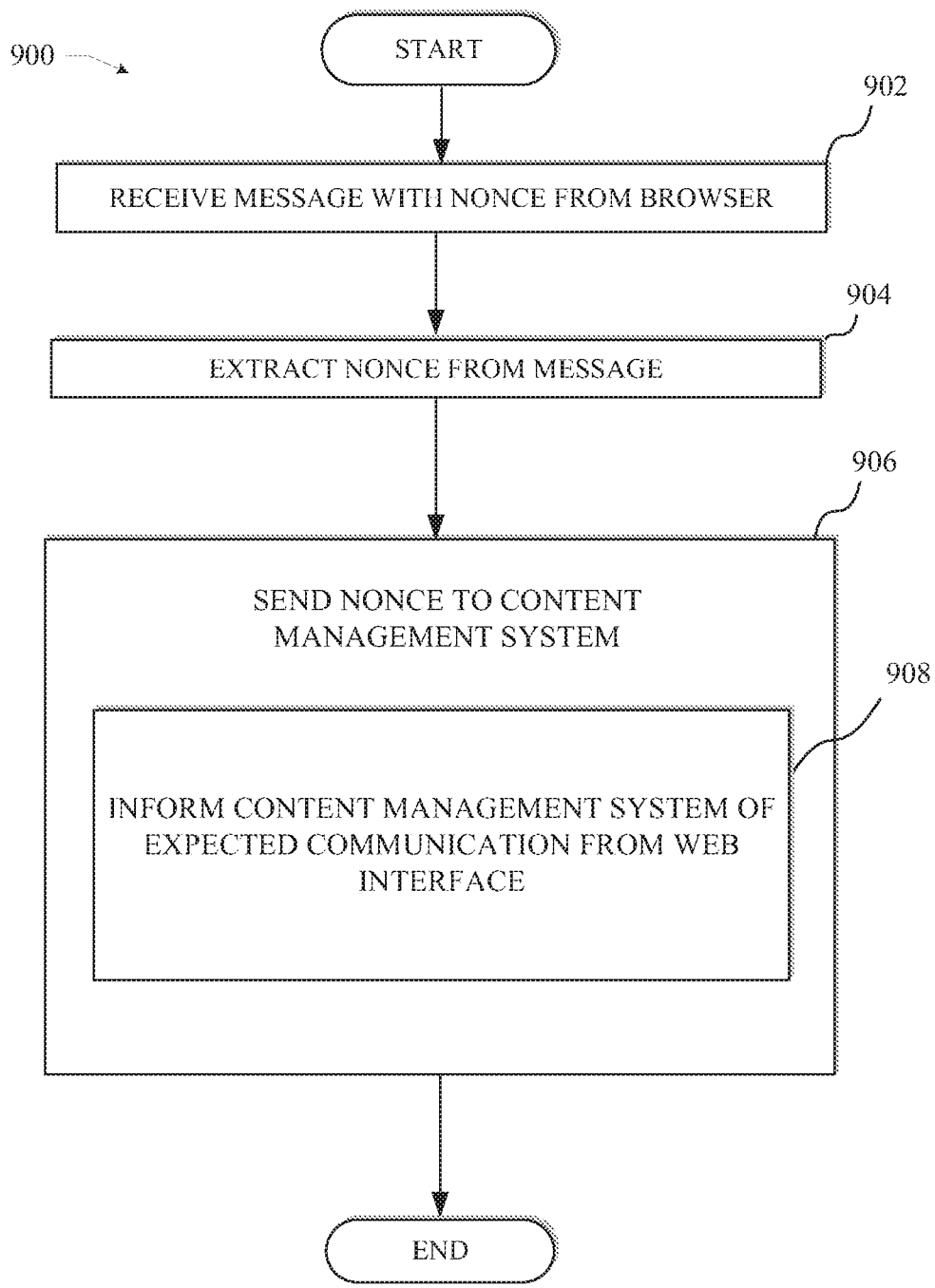
FIG. 9 shows a flowchart of an example embodiment for establishing a communications protocol handshake between a client application and a content management system.

Having disclosed some pertinent concepts, the disclosure now turns to the example method embodiments shown in FIGS. 7-9. For the sake of clarity, the methods are described in terms of client application 206, content management system 106, web interface 202, and browser application 210, as is shown in FIGS. 1 and 2A-B, configured to practice the various steps.

FIG. 7 shows an example method 700 for authenticating client application 206 under a user account with which browser application is authenticated. At step 702, client application 206 can run in unauthenticated mode. In some configurations, web interface 202 can initiate the authentication of client application 206 after determining that client application 206 is running in unauthenticated mode and browser application 210 is currently authenticated.

At step 704, client application 206 can establish a communication protocol handshake with content management system 106 and web interface 202. The communication protocol handshake can be established as described above with reference to FIG. 2B and as further described below with reference to FIG. 9. For example, client application 206, content management system 106, and web interface can establish the communication protocol handshake according to method 900 illustrated in FIG. 9.

At step 706, client application 206 can receive a request to authenticate under the user account used by browser application 210 to authenticate a current browser session between browser application 210 and web interface 202. Client application 206 can receive the request from web interface 202 through content management system 106, based on the communication channel established with the communication protocol handshake. For example, client application 206 can receive the request from web interface 202 based on communications protocol 250 illustrated in FIG. 2B.

At step 708, client application 206 can obtain a URL with a nonce. In any embodiment, the nonce can be part of the URL. For example, the nonce can be a string or field in the URL. Moreover, the URL can be an address referring to a resource, such as a web page, which can be configured to support or trigger an authentication operation with web interface 202 and content management system 106. Client application 206 can thus use the URL to authenticate with content management system. For example, client application 206 can use the URL to open a web page or web page file and proceed with authentication. The resource (e.g., web page, web page file, etc.) associated with the URL can include code or scripts (e.g., JavaScript code, or code in any other scripting language) to automatically log in client application 206 at content management system 106 based on the user account or credentials validated or authenticated for a current session between browser application 210 and web interface 202.

The nonce can be associated with client application 206. For example, the nonce can be mapped or designated to client application 206 at content management system 106. This way, the nonce can represent client application 206, and identify client application 206 at content management system 106. Content management system 106 can use the nonce to validate or verify the identity of the client application to be authenticated (i.e., client application 206). For example, browser application 210 can use the nonce to perform an operation requesting authentication of client application 206 at content management system 106.

Content management system 106 can use the nonce to associate client application 206 with browser application 210 in order to then authenticate client application 206 with the credentials used by browser application 210 to authenticate. For example, since the nonce can associate client application 206 to browser application 210 (and any authenticated sessions associated with browser application 210), content management system 106 can use the nonce to confirm which credentials to use to authenticate client application 206, viz., the credentials used by browser application 210 to authenticate an active or current session.

In some configurations, the URL and/or nonce can be received by client application 206 from content management system 106. For example, content management system can generate the nonce for client application 206 and send the URL and nonce to client application 206 for authenticating. Client application 206 can also obtain the URL and/or nonce in other ways. For example, client application 206 can generate the URL and/or nonce, or receive the URL and/or nonce from another entity, such as browser application 210.

At step 710, client application 206 can send a command with the URL and nonce to browser application 210 to trigger browser application 210 to open the URL and authenticate client application 206 with content management system 106. For example, the command can trigger browser application 210 to open a web page or web page file located at the address represented by the URL, and communicate with web interface 202 to request authentication of client application 206 with content management system 106. The request can instruct content management system 106 to authenticate client application 206 based on the credentials used to authenticate browser application 210 (or an authenticated session of browser application 210). The request can include the nonce to identify client application 206 as previously explained.

The web page or web page file associated with the URL can be configured to run code and/or scripts to authenticate client application 206. For example, the web page or web page file can include a script which executes when the web page or web page file is opened to perform an authentication process. The script can extract the nonce and use the nonce to authenticate client application 206.

FIG. 8A shows a flowchart of an example method 800 for authenticating client application 206 with credentials used by browser application 210 to authenticate. At step 802, content management system 106 and web interface 202 can establish a communications protocol handshake with client application 206. Communications protocol 250 in FIG. 2B can be implemented to establish the communications protocol handshake at step 802. Moreover, method 900 shows an example method for establishing the communications protocol handshake at step 802.

At step 804, content management system 106 or web interface 202 can determine that browser application 210 is authenticated with content management system 106. For example, web interface 202 can determine that browser application 210 is logged in under a specific user account.

At step 806, content management system 106 or web interface 202 can determine if client application 206 is running at client device 102$_1$. If client application 206 is not running, method 800 can end. On the other hand, if client application 206 is running, at step 808, content management system 106 and/or web interface 202 can determine if client application 206 is currently authenticated. If yes, method 800 can end, and if no, method 800 can proceed to step 810.

At step 810, content management system 106 or web interface 202 can instruct client application 206 to authenticate based on the credentials used by browser application 210 to authenticate. For example, web interface 202 can send a message to client application 206, instructing client application 206 to authenticate. Web interface 202 can send the message to client application 206 via a communication channel created by the communication protocol handshake established at step 802. Moreover, web interface 202 can send the message to client application 206 through content management system 106, based on communications protocol 250, as described above with reference to FIG. 2B. The message from web interface 202 to client application 206 can be relayed through content management system 106 based on a nonce included in the message and associated with client application 206 and/or web interface 202.

Client application 206 can receive the instruction and trigger browser application 210 to authenticate client application 206 based on the credentials used by browser application 210 to authenticate. For example, in response to receiving the instruction from web interface 202, client application 206 can send a command or message to browser application 210, instructing browser application 210 to open a web page or web page file for performing an authentication of client application 206. To illustrate, client application 206 can send a command with a URL and nonce to browser application 210, to trigger browser application 210 to use the URL and nonce to authenticate client application 206 with content management system 106 under the user account authenticated for browser application 210.

At step 812, content management system 106 or web interface 202 can receive a request from browser application 210 to authenticate client application 206 based on the credentials used by browser application 210 to authenticate. As previously mentioned, the request can be triggered by a command from client application 206 to browser application 210 provided in response to the instruction from step 810.

At step 814, content management system 106 or web interface 202 can determine that a nonce in the request from step 812 is associated with client application 206. For example, content management system 106 can identify the nonce in the request and determine the nonce corresponds to client application 206 based on an association or mapping at content management system 106 between the nonce and client application 206.

At step 816, content management system 106 or web interface 202 can authenticate client application 206 with the credentials used by browser application 206 to authenticate a browser session (e.g., session between browser application 206 and web interface 202). For example, content management system 106 can log in client application 206 under a user account with which browser application 210 is logged in.

FIG. 8B shows a flowchart of an example method 820 for authenticating browser application 210 with credentials used by client application 206 to authenticate. At step 822, content management system 106 and web interface 202 can establish a communications protocol handshake with client application 206. Communications protocol 250 in FIG. 2B can be implemented to establish the communications protocol handshake at step 822. Moreover, method 900 shows an example method for establishing the communications protocol handshake at step 822.

At step 824, content management system 106 or web interface 202 can determine that browser application 210 is not authenticated with content management system 106. For example, web interface 202 can determine that browser application 210 is currently logged out.

At step 826, content management system 106 or web interface 202 can determine if client application 206 is currently authenticated. If client application 206 is not authenticated, at step 828, web interface 202 can prompt browser application 210 to authenticate (e.g., prompt 502 in FIG. 5A). On the other hand, if client application 206 is authenticated, web interface 202 can obtain the username from client application 206 used to authenticate client application 206.

Web interface 202 can obtain the username from client application 206 based on a communication channel created by the communication protocol handshake established at step 822. For example, the communication protocol handshake at step 822 can establish a channel between client application 206 and web interface 202, through content management system 106. Web interface 202 can thus send a username request for client application 206 via the channel through content management system 106, and receive the username from client application 206 via the channel through content management system 106. Moreover, web interface 202 and client application 206 can exchange the username request and username response through the channel based on communications protocol 250, as described above with reference to FIG. 2B. For example, the messages between web interface 202 and client application 206 (e.g., username request and username) can be relayed through content management system 106 based on a nonce included in the respective messages which is associated with client application 206 and/or web interface 202.

At step 832, web interface 202 can provide a prompt to browser application 210 requesting the user to automatically authenticate with the username received from client application 206. For example, web interface 202 can provide a prompt, such as prompt 502 shown in FIG. 5A, to be rendered by browser application 210 at client device 102$_1$, requesting approval from the user to automatically log in with the username or continue the session under the user account associated with the username.

Browser application 210 can render the prompt and obtain input from the user requesting to automatically log in or continue the session under the user account associated with the username. Browser application 210 can receive the input from the user and generate an instruction to authenticate browser application 210 as further described below.

At step 834, client application 206 can receive an instruction to authenticate browser application 210. The instruction can be received in response to user input or selections obtained through the prompt from step 832.

At step 836, client application 206 can instruct browser application 210 to open a web page file configured to trigger authentication of browser application 210. For example, client application 206 can send a command to open the web page file in order to log in browser application 210.

The command can be, for example, an OS command. Moreover, in some configurations, the web page file can be a local web page file, such as a local HTML file, containing code (e.g., scripts) for communicating with web interface 202 and/or content management system 106 to authenticate browser application 210. In some cases, the local web page file can be dynamically generated by client application 206 based on, for example, the instruction received at step 834.

The code in the web page file can be configured to run or execute when the web page file is opened. For example, when the web page file is opened, the code can automatically execute to perform an operation for authenticating browser application 210.

In response to the instruction from client application 206, browser application 210 can open the web page file to log in with the username. Browser application 210 can communicate with web interface 202 to send an authentication request to content management system 106.

At step 838, content management system 106 can receive a request to authenticate browser application 210 under the username. For example, content management system 106 can receive a request from web interface to authenticate browser application 210 with the username. The request to authenticate can include a nonce associated with client application 206. Content management system 106 can use the nonce to associate the request with client application 206. Content management system 106 can also use the nonce to identify or verify which credentials to use when authenticating browser application 210. For example, content management system 106 can use the nonce to associate browser application 210 with client application 206. Based on this association, content management system 106 can determine or confirm that browser application 210 should be authenticated with the credentials used by client application 206 to authenticate.

At step 840, content management system 106 can then authenticate browser application 210 under the username. In some cases, content management system 106 can also notify web interface 202 and/or browser application 210 that browser application 210 has been authenticated.

FIG. 9 shows a flowchart of an example embodiment 900 for establishing a communications protocol handshake between client application 206 and content management system 106. The communications protocol handshake can create a communications channel for communications between client application 206 and web interface 202 based on communications protocol 250 described above with reference to FIG. 2B.

At step 902, client application 206 can receive a message with a nonce from browser application 210. For example, client application 206 can receive a secure session request from browser application 210 containing the nonce.

At step 904, client application 206 can extract the nonce in the message. At step 906, client application 206 can then send the nonce to content management system 106. When sending the nonce to content management system 106, at step 908, client application 206 can also inform content management system 106 of an expected communication from browser application 210 and/or web interface 202.

For example, client application 206 can send the nonce to content management system 106 in a message indicating that client application 206 is expecting to receive one or more messages from web interface 202. In response, content management system 106 can associate the nonce with client application 206. Content management system 106 can also maintain a channel or connection open for communicating with client application 206.

As further explained with reference to FIG. 2B, content management system 106 can then relay messages associated with the nonce between client application 206 and web interface 202. For example, if content management system 106 receives a message with the nonce from web interface 202, content management system 106 can then relay the message to the client application associated with the nonce (i.e., client application 206). Content management system 106 can relay the message to client application 206 through a channel or connection previously opened between client application 206 and content management system 106, for example.

Figure 10A:
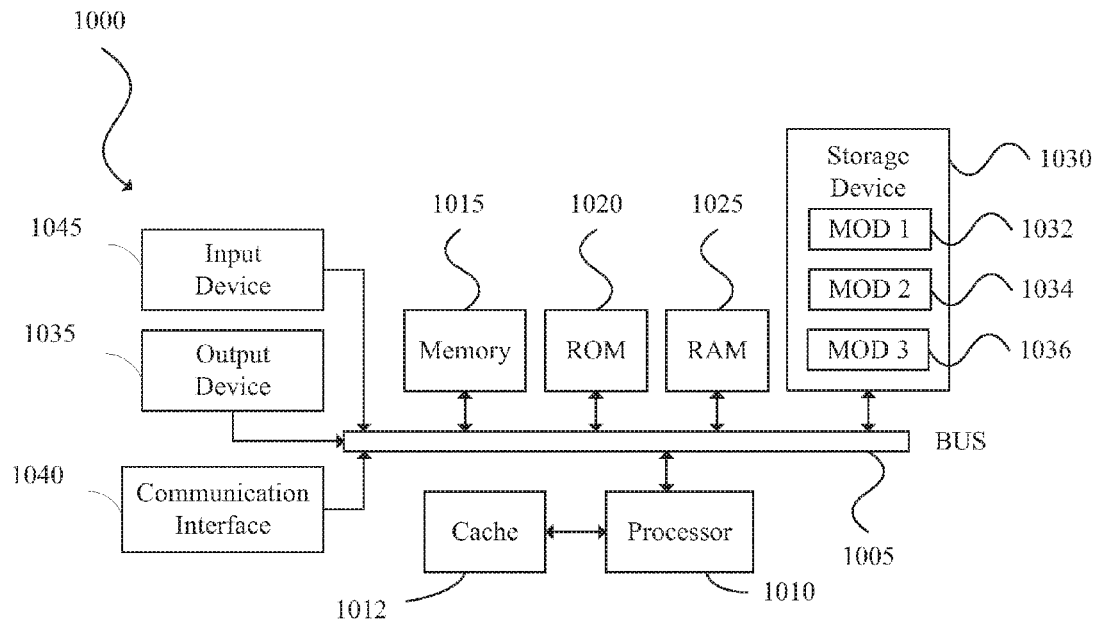
FIGS. 10A and 10B show example system embodiments for implementing various embodiments of the present technology.
Figure 10B:
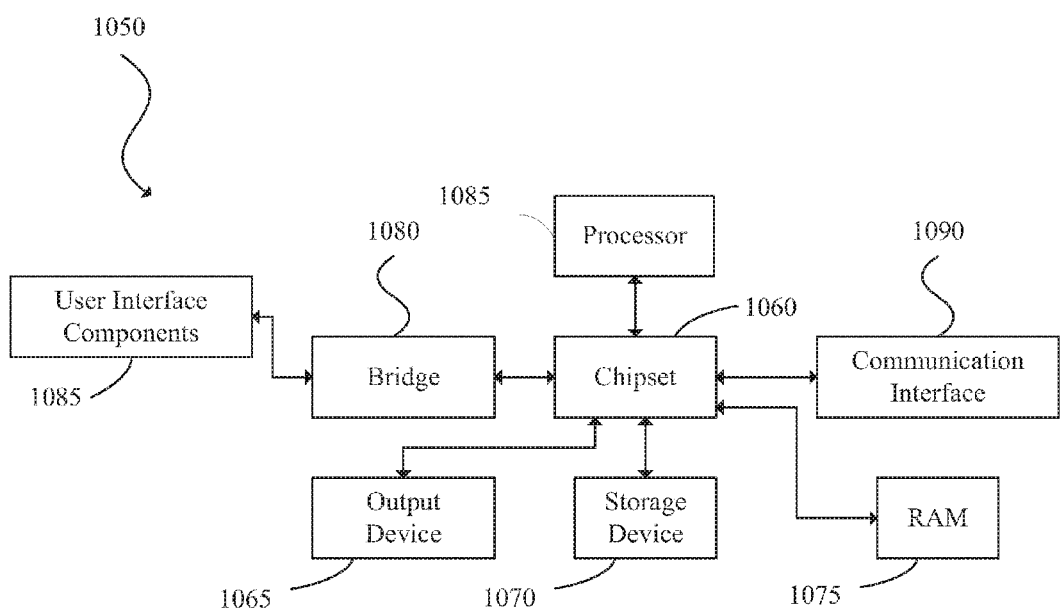

10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A shows a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A or B" indicates that either a set of A or B (e.g., A only or B only) or a set of A and B (e.g., both A and B) can satisfy the claim.

What is claimed is:

1. A method comprising:
    establishing a communication channel through a content management system, between a client application at a client device and a website associated with the content management system, wherein establishing the communication channel comprises:
        receiving, by the client application, from a browser application at the client device, a first message comprising a first nonce; and
        sending, from the client application to the content management system, a second message comprising the first nonce, wherein the first nonce associates the client application with the browser application to yield an association, wherein the association enables the content management system to relay one or more communications between the client application and the website;
    receiving, by the client application from the content management system via the communication channel, a request by the website for the client application to authenticate with the content management system under a user account used by the browser application at the client device to authenticate a current session between the browser application at the client device and the website with the content management system; and
    sending, from the client application to the browser application, a command comprising a uniform resource locator (URL) and the first nonce, the command instructing the browser application to use the URL and the first nonce to authenticate the client application with the content management system under the user account used by the browser application to authenticate the current session between the browser application and the website and verify the association of client application and browser application to the content management system.

2. The method of claim 1, further comprising:
    sending, by the client application, the first nonce to the content management system; and
    after sending the first nonce to the content management system, obtaining the URL from the content management system.

3. The method of claim 1, wherein the command instructs the browser application to authenticate the client application with the content management system by:
    opening a browser page and navigating to the URL with the browser page;
    providing the first nonce to the content management system via the browser page; and
    triggering a script configured to instruct the content management system to authenticate the client application based on the first nonce and validate a client session associated with the client application under the user account based on credentials used to authenticate the current session between the browser application and the website.

4. The method of claim 1, wherein the command comprises an operating system (OS) command.

5. The method of claim 1, wherein the first nonce is associated with a client identifier at the content management system, the client identifier being associated with the client application.

6. The method of claim 1, wherein the request by the website for the client application to authenticate with the content management system comprises the first nonce.

7. The method of claim 1, wherein the client application receives the request to authenticate in response to a determination that the client application is not authenticated and the current session between the browser application and the website is authenticated.

8. The method of claim 1, further comprising receiving, by the client application from the content management system, a notification that the content management system has authenticated the client application.

9. A system comprising:
    one or more processors; and
    at least one computer-readable medium storing computer-readable instructions that when executed cause the one or more processors to:

run a client application associated with a content management system in unauthenticated mode;

establish a communication channel through the content management system between the client application and a website associated with the content management system, wherein establishing the communication channel comprises:

receiving, by the client application, from a browser application on the system, a first message comprising a unique identifier associated with the browser application; and sending, from the client application to the content management system, a second message comprising the unique identifier, wherein the unique identifier associates the client application with the browser application to yield an association, wherein the association enables the content management system to relay one or more communications between the client application and the website;

receive, via the communication channel, a request by the website for the client application to authenticate with the content management system under a user account used to authenticate a session between the browser application running at the system and the website with the content management system;

obtain, by the client application, a uniform resource locator (URL) including a nonce comprising the unique identifier associated with the browser application; and send, from the client application to the browser application, a command comprising the URL and nonce, the command triggering the browser application to use the URL and nonce to authenticate the client application with the content management system under the user account.

10. The system of claim 9, wherein the command triggers the browser application to authenticate the client application with the content management system by:

opening a browser page and navigating to the URL with the browser page;

providing the nonce to the content management system via the browser page; and triggering a script configured to instruct the content management system to authenticate the client application based on the nonce and validate a client session associated with the client application under the user account based on credentials used to authenticate the current session between the browser application and the website.

11. The system of claim 9, the at least one computer-readable medium storing computer-readable instructions that when executed cause the one or more processors to receive the URL from the content management system in response to sending the unique identifier to the content management system.

12. The system of claim 9, wherein the nonce is associated with a client identifier at the content management system, the client identifier being associated with the client application.

13. The system of claim 9, wherein the command comprises an operating system (OS) command.

14. A content management system comprising:
one or more processors; and
at least one computer-readable medium storing computer-readable instructions that when executed cause the content management system to:

determine that a client application running at a client device is not authenticated with the content management system, to yield a first determination;

determine that a session between a browser application at the client device and a website associated with the content management system is authenticated with the content management system, to yield a second determination;

based on the first determination and the second determination, obtain, from the website, a first message for the client application at the client device, the first message requesting the client application to authenticate with the content management system under a user account used to authenticate the session between the browser application at the client device and the website with the content management system;

relay at least part of the first message from the website to the client application;

send, to the client application, a nonce associated with the client application;

receive, from the website, a second message comprising the nonce and a request to authenticate the client application under the user account used to authenticate the session between the browser application and the website; and in response to the second message, authenticate the client application under the user account.

15. The content management system of claim 14, wherein the nonce is generated by the content management system to identify the client application.

16. The content management system of claim 15, the computer-readable medium storing additional computer-readable instructions that when executed cause the content management system to:

associate the nonce with an identifier of at least one of the client device and the client application.

17. The content management system of claim 14, wherein the nonce is sent to the client application with a uniform resource locator (URL) associated with a web page comprising a script configured to trigger the website to send the second message to the content management system.

18. The content management system of claim 14, wherein the content management system receives the first message from the website and relays at least part of the first message to the client application by:

receiving, from the client application, a unique identifier that associates the client application with the browser application to yield an association;

receiving, from the website, the first message along with a second unique identifier;

determining that the first unique identifier and the second unique identifier match;

based on the match, determining that the client application is to receive at least part of the first message from the website; and sending at least part of the first message to the client application.

19. The content management system of claim 14, the computer-readable medium storing additional computer-readable instructions that when executed cause the content management system to:

receive, from the website, a username request directed to the client application, the username request comprising the nonce;

send, to the client application, the username request from the website;

receive, from the client application, a username associated with the user account used to authenticate the browser application and the nonce associated with the client application; and in response to receiving the username and nonce, sending the username to the website.

20. The content management system of claim 14, wherein the content management system authenticates the client application by:

associating, based on the nonce, the client application with at least one of the browser application and the session between the browser application and the website, to yield an association; and based on the association, authenticating the client application based on credentials used to authenticate the session between the browser application and the website.

* * * * *